(12) United States Patent
Srienc et al.

(10) Patent No.: US 9,353,238 B2
(45) Date of Patent: May 31, 2016

(54) COMPOSITIONS INCLUDING POLY(HYDROXYALKANOATES) AND GRAPHENE

(71) Applicant: REGENTS OF THE UNIVERSITY OF MINNESOTA, Minneapolis, MN (US)

(72) Inventors: Friedrich Srienc, Lake Elmo, MN (US); Ahmed Abdelhay Ahmed Abdala, Abu Dhabi (AE); John Stephen Francis Barrett, Columbia Heights, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 14/291,898

(22) Filed: May 30, 2014

(65) Prior Publication Data

US 2014/0357788 A1  Dec. 4, 2014

Related U.S. Application Data

(60) Provisional application No. 61/829,485, filed on May 31, 2013.

(51) Int. Cl.
| | | |
|---|---|---|
| *C08G 63/60* | (2006.01) | |
| *C08K 3/04* | (2006.01) | |
| *C08L 67/04* | (2006.01) | |
| *C08L 67/00* | (2006.01) | |

(52) U.S. Cl.
CPC . *C08K 3/04* (2013.01); *C08L 67/04* (2013.01); *C08L 2205/02* (2013.01)

(58) Field of Classification Search
CPC ........................................................ C08K 3/04
USPC ........................................................ 524/599
See application file for complete search history.

(56) References Cited

U.S. PATENT DOCUMENTS

2010/0234503 A1* 9/2010 Khabashesku et al. ....... 524/213

FOREIGN PATENT DOCUMENTS

WO   WO 2008100333   *  8/2008

OTHER PUBLICATIONS

Effects of Graphene Nanoplatelets and Reduced Graphene Oxide on Poly(lactic acid) and Plasticized Poly(lactic acid): A Comparative Study; Buong Woei Chieng et al. Polymers 2014, 6, 2232-2246.*
Nature Communications | Article ; Yu Zhu, et al., A seamless three-dimensional carbon nanotube graphene hybrid material;. :Nature Communications vol. 3,Article No. 1225; Received Apr. 25, 2012 ; PublishedNov. 27, 2012; Abstract.*
Nature Communications | Article ; Yu Zhu, et al., A seamless three-dimensional carbon nanotube graphene hybrid material;. :Nature Communications vol. 3,Article No. 1225; Received Apr. 25, 2012 ; Published Nov. 27, 2012; Abstract.*
Majid JamshidianPoly-Lactic Acid: Production, Applications,Nanocomposites, and Release Studies, Majid Jamshidian, et al. Institute of Food Technologies, vol. 9, 2010.*
Barrett et al., "Synthesis and Properties of structured PHAs and their nanocomposites," Abstract of Presentation at the International Symposium on Biopolymers, Oct. 7-10, 2012; Cairns, Queensland, Australia.
De Koning et al., "Crystallization phenomena in bacterial poly[(R)-3-hydroxybutyrate]: 3. Toughening via texture changes," *Polymer*, 1994; 35(21):4598-4605.
Kim et al., "Graphene/Polymer Nanocomposites," *Macromolecules*, Aug. 24, 2010; 43(16):6515-6530.
Srienc et al., "Production of Chemicals and Polymers from $CO_2$ and $H_2$," *Abu Dhabi-Minnesota Institute for Research Excellence: Admire grant*; $2^{nd}$ Quarter update, Jun. 2012.
Tandon et al., "The effect of aspect ratio of inclusions on the elastic properties of unidirectionally aligned composites," *Polym. Compos.*, Oct. 1984; 5(4), 327-333.
Yun et al., "Mechanical Properties of Biodegradable Polyhydroxyalkanoates/Single Wall Carbon Nanotube Nanocomposite Films," *Polymer Bulletin*, Aug. 2008; 61(2):267-275.
Zhang et al., "Morphology, Crystallization Behavior, and Dynamic Mechanical Properties of Biodegradable Poly(ε-caprolactone)/Thermally Reduced Graphene Nanocomposites," Ind. Eng. Chem. Res. 2011, 50 (24), 13885-13891. Available online Nov. 8, 2011.
Kim et al., "Graphene/Polymer Nanocomposites," *Macromolecules*, 2010;43:6515-6530.
Knauert et al., "The Effect of Nanoparticle Shape on Olymer-Nanocomposite Rheology and Tensile Strength," *Journal of Polymer Science: Part B: Polymer Physics*, Feb. 23, 2007:1882-1987.
Prasek et al., "Method for carbon nanotubes synthesis-review," *J of Mater Chem*, 2011;21:15872-15884.
Tandon et al., "The Effect of Aspect Ration of Inclusions of the Elastic Propterties of Unidirectionally Aligned Composites," *Polymer Composites*, Oct. 1984;5(4): 7 pgs.
Abdala et al., "Synthesis of Poly-(R)-3-hydroxyalkanoic acids (PHA) and their Graphene Nanocomposites," *American Chemical Society*, Abstract. Available Jun. 25, 2012.
Abdala et al., "Synthesis of Poly-(R)-3-hydroxyalkanoic acids (PHA) and their Graphene Nanocomposites," *American Chemical Society Preprint Publication*. Jul. 5, 2012.
Abdala et al., "Synthesis of Poly-(R)-3-hydroxyalkanoic acids (PHA) and their Graphene Nanocomposites," *American Chemical Society National Meeting and Exposition*, Presentation, Philadelphia, PA. Aug. 20, 2012.

* cited by examiner

*Primary Examiner* — Terressa Boykin
(74) *Attorney, Agent, or Firm* — Mueting, Raasch & Gebhardt, P.A.

(57) ABSTRACT

A composite including poly(hydroxyalkanoate); and graphene. Also disclosed are methods of making articles.

30 Claims, 10 Drawing Sheets

COMPOSITIONS INCLUDING POLY(HYDROXYALKANOATES) AND GRAPHENE

CROSS-REFERENCE TO RELATED APPLICATION

This application claims priority to U.S. Provisional Patent Application Ser. No. 61/829,485, filed May 31, 2013, which is incorporated herein by reference.

BACKGROUND

Poly(hydroxyalkanoates) (PHA) are a class of polymeric materials produced naturally by a variety of environmental microorganisms as a means of carbon and energy storage during times of nutrient excess. Purification of PHA from cell biomass produces a plastic material with physical and mechanical properties similar to those of petroleum-derived polymers. PHA has become desirable because of its rapid biodegradation, its biocompatibility for use in medical applications, and the ability to synthesize it from a variety of renewable feedstocks including: sugars, plant oils, industrial and municipal waste streams, and carbon dioxide for example. Composites including PHA can provide the ability to alter the properties of the PHA.

SUMMARY

Disclosed is a composite including poly(hydroxyalkanoate) and graphene.

Also disclosed is a method of forming an article that includes the steps of mixing poly(hydroxyalkanoate) and graphene to form a composite mixture; and forming an article from the composite mixture.

An article that includes a composite, the composite including poly(hydroxyalkanoate) according to formula (I)

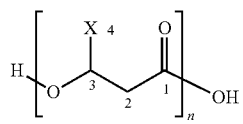

(I)

wherein X can independently include carbon containing chains having from three to eleven carbons, and n can be an integer greater than 10; and graphene.

These and various other features and advantages will be apparent from a reading of the following detailed description.

BRIEF DESCRIPTION OF THE FIGURES

(FIG. 3c). For easy comparison with $C_p$ values (J/g/° C.) $E_{50\%}$ values (J/g) have been scaled by the corresponding increase in temperature between 270-$T_{50\%}$° C. and are presented in units of J/g/° C. (FIG. 3c).

FIG. 4b PHOe/graphene; and FIG. 4c PHD/graphene).

FIG. 5b PHOe/graphene; and FIG. 5c PHD/graphene).

FIG. 9b PHOe; and FIG. 9c PHD).

FIGS. 10a to 10c shows mass versus temperature, FIGS. 10d to 10f show mass versus heat-flow and FIGS. 10g, 10h, and 10j show the rate of mass loss versus temperature.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
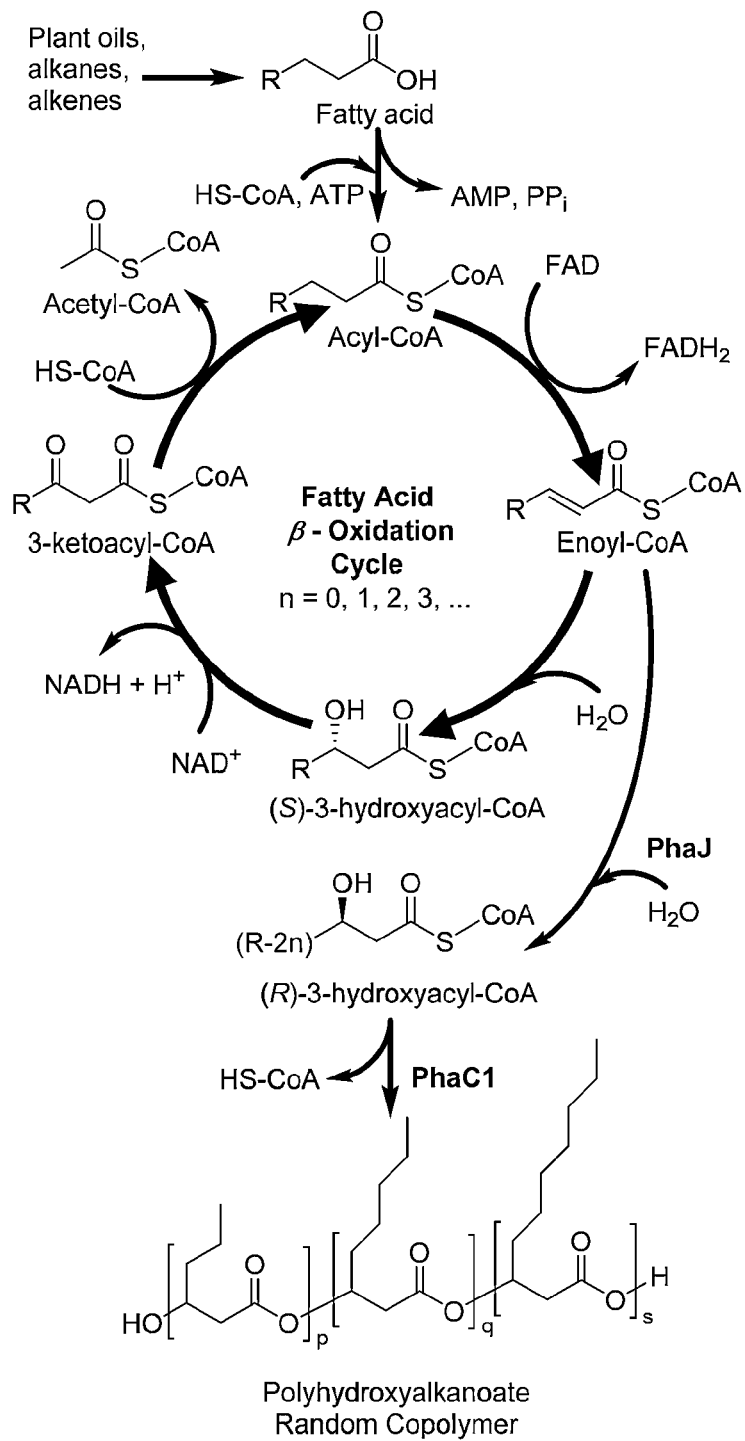
FIG. 1 illustrates the metabolic pathway for PHA synthesis in *P. oleovorans*.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

Disclosed herein are compositions that can also be described as composites. Disclosed composites can include one or more poly(hydroxyalkanoates) (PHA) and graphene. Disclosed composites can offer different, and in some embodiments advantageous properties when compared with pure PHA.

A composite can refer to a material that is made from two or more constituent materials. The individual components of a composite remain separate and distinct within the finished composite. In some embodiments, disclosed composites can be referred to as nanocomposites. A nanocomposite is a solid material having multiple constituent materials that can also be referred to as phases. In some embodiments, at least one of the phases can have one, two or three dimensions in the nanometer scale, in some embodiments one, two or three dimensions can be not greater than 100 nanometers (nm). Nanocomposites can also be described as a solid combination of a bulk matrix and a nano-dimensioned phase(s) having different properties.

Disclosed composites can include one or more poly(hydroxyalkanoates) and graphene. Poly(hydroxyalkanoate)(s) can also be referred to as PHA or PHAs. Structurally, the PHA backbone is comprised of a 3-carbon repeat unit with oxo-ester linkages. A generic structure of a class of PHAs is provided below in formula (I)

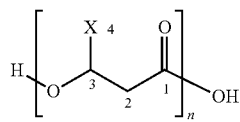

(I)

where X can include a carbon containing group and n can be an integer greater than or equal to 10. In some embodiments, X can be a carbon containing chain having a total carbon number from zero to eleven (11), and n can be an integer greater than or equal to 10. In some embodiments, X can be a carbon chain having a total length from three (3) to eleven (11), and n can be an integer from $1 \times 10^3$ to $1 \times 10^6$. In some embodiments, X can include moieties other than aliphatic ones. For example X can include linear chains, branched chains, one or more unsaturated carbons as well as aromatic moieties. In some embodiments, X can include elements other than carbon and hydrogen, In some embodiments, X can include any combination of chemical elements or molecular substituents, as such, X can include, oxygen, nitrogen, sulfur, halogens, hydroxyls, carbonyls, aldehydes, ethers, esters, epoxies, metals, and combinations thereof for example. It should also be understood that useful PHAs can include more than one X group within the polymer chain, i.e., all of the multiple repeating units in the particular PHA need not have the same X group. The incorporation of multiple X groups along the polymer backbone can be achieved during polymer synthesis reactions in which different monomers with a specific X group are added to the elongating polymer chain. Such a molecule consisting of multiple monomer types is referred to as a copolymer. If the specific X groups are randomly distributed along the chain length of the PHA, it can be considered a random copolymer. Furthermore molecules in which different monomers are arranged in large homogenous blocks covalently bonded to other homogenous block are referred to as block copolymers In some embodiments, PHAs that can be utilized can include X groups that are related as being a series of alkyl chains each with two less carbons (i.e., an octyl chain, a hexyl chain, a butyl chain and an ethyl chain). Such compositions of related monomer types are produced naturally during microbial biosynthesis of PHAs. It should also be understood that useful PHAs can include both alkyl and alkenyl groups.

The properties of different PHAs can stem in large part from the identity of the X groups. In some embodiments, the PHA can be described by the total chain length of the monomer repeat unit. The total chain length is defined as the sum of the three carbons along the main polymer backbone plus any additional carbons at position X For example, in an embodiment where X is a methyl group ($CH_3$), the total chain length becomes 4; and in an embodiment where X is a undecyl group ($C_{11}H_{23}$), the total chain length becomes 14.

PHAs can be classified by their chain length. Short chain length PHAs have a chain length from three (3) to five (5), and can be referred to as $PHA_{SCL}$. Another example of a $PHA_{SCL}$ is poly(3-hydroxypropionic acid) (PHP). Another example of a $PHA_{SCL}$ is polyhydroxybutyrate (PHB). PHB, which possesses a single methyl group at the 3-carbon position (i.e., it has a total chain length of four (4)), is a stiff thermoplastic with a high melting temperature. PHB is by far the most commonly used form of PHA. Some embodiments of disclosed composites can include $PHA_{SCL}$. Some embodiments of disclosed composites can include PHB, for example.

PHAs having a chain length from six (6) to fourteen (14) can be referred to as medium chain PHAs, or $PHA_{MCL}$. $PHA_{MCL}$ contain longer aliphatic appendages (3-11 carbons) at the 3-carbon position which can enhance elasticity but reduce polymer strength and melting temperature. Generally, $PHA_{MCL}$ has received less commercial interest, primarily due to its low melting temperature and low strength. In some embodiments, PHAs having a chain length from eight (8) to fourteen (14) (appendages, X, including five (5) to eleven (11) carbons) can be utilized.

In some embodiments, disclosed articles can include $PHA_{SCL}$. In other embodiments, disclosed articles can include $PHA_{MCL}$. In some embodiments, disclosed articles that include $PHA_{MCL}$ can have different, and in some cases, very different properties than articles that include $PHA_{SCL}$. In other embodiments articles may contain blends, copolymers, or block copolymers comprised of both PHAscl and PHAmcl.

In embodiments where the PHA molecule includes more than one monomer type, the PHA molecule can be described by the set of different chain lengths. For example a PHA copolymer having Xs of $CH_3$, $C_3H_7$, and $C_5H_{11}$ could be described as poly(hydroxybutyrate)-co-poly (hydroxyhexanoate)-co-poly(hydroxyoctanoate);or PHB-co-PHH-co-PHO.

In some embodiments, PHA that has a pre-existing molecular network can be utilized to form composites. In some embodiments, crosslinking of the PHA may occur upon formation of an article (discussed below), and in some embodiments referred to instantly, a PHA that is utilized may already have pre-existing crosslinking or a pre-existing super-molecular network. For example, a network of molecular crosslinks can exist in PHA that is to be utilized to form a disclosed composite, a gel network can exist in PHA that is to be utilized to form a disclosed composite, a rubber network can exist in PHA that is to be utilized to form a disclosed composite, or any combination thereof. In some embodiments, the network of crosslinks may be formed after the graphene is added to the polymer.

PHAs can provide different properties to a composite, including for example chain packing length, capacity for non-covalent bonding with other components (for example graphene) of the composite, the extent of cross-linking, if present, or combinations thereof.

PHAs can be produced naturally by a variety of environmental microorganism as a means of carbon and energy storage during times of nutrient excess. Purification of PHA from cell biomass produces a plastic material with physical and mechanical properties similar to those of petroleum-derived polymers. The use of PHA may be desirable due to its relatively rapid biodegradation, biocompatibility for use in medical applications, and ability to synthesize it from a variety of renewable feedstocks including: sugars, plant oils, industrial and municipal waste streams, and carbon dioxide.

The composition of different polymer samples of PHA, or the identity of the Xs in formula (I), can be controlled via the type of carbon substrate fed to the batch during biosynthesis e.g. octane, octene, or decane as exemplified herein. FIG. 1 describes the metabolic pathway used by $P.\ oleovorans$ for the production of PHAs. An alkane and/or alkene in the media is consumed by the cell where inside it undergoes a string of enzymatic conversions to produce the corresponding fatty acid molecule which then becomes activated by attachment of a CoA moiety. From the fatty acyl-CoA intermediate the molecule is degraded via the β-oxidation cycle in which two carbons are removed to produce the corresponding n-2 fatty acyl-CoA and the central metabolite, acetyl-CoA. Subsequent rounds of β-oxidation are required to completely degrade the fatty acyl molecule. In $P.\ oleovorans$, one of the intermediates of β-oxidation, trans-2-enoyl-CoA is converted via an (R)-3-enoyl-CoA hydratase, PhaJ, to the monomer species, (R)-3-hydoxyalkanoyl-CoA. Monomers are then polymerized to PHA via the PhaC1 synthase molecule. Due to the cyclical nature of β-oxidation a distribution of enoyl-CoA molecules of decreasing chain length is produced. This combined with the broad substrate specificity of the PhaJ and PhaC1 enzymes can produce a random copolymer comprised of several monomer species. While the process of β-oxidation does produce the (S)-3-hydoxyalkanoyl-CoA species, only the R enantiomer is recognized by the PhaC1 synthase. The addition of saturated alkanes, octane and decane, produces 3-hydroxyalkanoate monomers while the addition of unsaturated alkanes, 1-octene, produces 3-hydroxyalkenoic acids.

Disclosed composites also include graphene. Graphene can generally be described as an atomically thick, two-dimensional sheet composed of $sp^2$ carbon atoms arranged in a honeycomb structure. There are two different types of processes for making graphene, bottom-up graphene processes and top-down graphene processes. In bottom-up processes, graphene is synthesized by a variety of methods, including for example, chemical vapor deposition (CVD), arc discharge, epitaxial growth on a substrate, such as SiC, chemical conversion, reduction of carbon monoxide (CO), unzipping carbon nanotubes, and self-assembly of surfactants. In top-down processes, graphene or modified graphene sheets are produced by separation/exfoliation of graphite or graphite derivatives (such as graphite oxide (GO), and graphite fluoride). In some embodiments, top-down processes may be more amenable to production of graphite for inclusion in a composite. There are four different types of top-down processes, including direct exfoliation of graphite, exfoliation of graphite oxide GO, chemical reduction of GO, and thermal exfoliation and reduction of GO, which is also referred to as thermally reduced graphene oxide (or TRG). Disclosed composites can include graphene made using any known methods, including those mentioned herein. In some embodiments, graphene produced using TRG methods can be utilized herein. In some embodiments, TRG that is utilized may have an oxygen content that provides a carbon to oxygen ratio (C:O ratio) from 2:1 to 1:0, depending on the synethesis conditions utilized. In some embodiments, TRG that is utilized can have a C:O ratio of 10:1.

Graphene can have combinations of various properties, for example it can have a Young's modulus of 1 TPa, an ultimate strength of 130 GPa, a thermal conductivity of 5000 W/(m·K), an electrical conductivity of 6000 S/cm, and an extremely high surface area (theoretical limit: 2630 $m^2$/g).

Graphene that is included in disclosed composites may optionally be chemically modified. For example, graphene could be chemically modified in an effort to promote more favorable interaction with the PHA. Similarly, graphene could be chemically modified to provide a stronger molecular interaction with the PHA polymer matrix and enhance its dispersion within the matrix.

Disclosed composites can also include optional components beyond PHA and graphene. For example, other polymeric components could optionally be included. Similarly, non-polymeric components could also optionally be included. For example, fillers such as wood, flour, clay, layered silicate, or carbon nanotubes could be optionally included in disclosed composites. Such fillers could be added to obtain desired properties of composites, replace more expensive components (such as graphene) with components that should not detrimentally affect the properties, or some combination thereof, for example.

Disclosed composites can have various amounts of PHA, graphene, and optional other components. As the amount of graphene in a composite is increased, the composite will become more brittle. As the amount of graphene in a composite is decreased, properties that are desired to be imparted by the graphene, i.e., mechanical strength and electrical conductivity for example, will be decreased. In some embodiments, a disclosed composite does not include greater than 5% by volume (vol %) of the total volume of the composite. In some embodiments, a disclosed composite does not include greater than 3 vol %. In some embodiments, a disclosed composite does not include greater than 2.5 vol %. In some embodiments, a disclosed composite includes from 0.25 vol % to 5 vol %. In some embodiments, a disclosed composite includes from 0.5 vol % to 3 vol %. In some embodiments, a disclosed composite includes from 0.25 vol % to 2.5 vol %. The amount of graphene in the composite can also be described by the weight of the graphene in the composite. In some embodiments, a disclosed composite does not included greater than 10% by weight (wt %) of the total weight of the composite. In some embodiments, a disclosed composite does not include greater than 5 wt %. In some embodiments, a disclosed composite includes from 0.5 wt % to 10 wt %. In some embodiments, a disclosed composite includes from 1 wt % to 6 wt %. In some embodiments, a disclosed composite includes from 0.5 wt % to 5 wt %.

Disclosed composites can be formed using commonly known methods. Generally, disclosed methods can include steps of mixing PHA and graphene to form a composite mixture and forming an article from the composite mixture. In some embodiments, the PHA and graphene can be combined as pure components without a solvent to form the composite mixture and then formed into an article. Combining the PHA and graphene as pure components without a solvent could be accomplished using extrusion and melt processing techniques for example. Once the PHA and graphene are mixed (via an extruder for example), the mixture could then be hot pressed, and cooled to form an article upon reaching a temperature at which the composite solidifies.

In some embodiments, the PHA and graphene can be separately mixed with a solvent (or two different kinds of solvents) and then the two liquid mixtures could be combined. In such embodiments, the PHA could be added to a solvent that can dissolve the PHA and the graphene can be added to a solvent that can disperse the graphene. The two solvents can, but need not be the same solvent. In some embodiments, the PHA can be dissolved in a solvent by stirring, sonication, heating, other known methods, or combinations thereof. In some embodiments, the graphene can be dispersed in a solvent by stirring, sonication, heating, other known methods, or combinations thereof. Conditions surrounding sonication of the graphene/solvent mixture, including timing and intensity, may be selected based on a desire to at least minimize damage to the graphene. In some embodiments, the PHA can be mixed with a solvent, stirred and heated; and the graphene can be mixed with a solvent and sonicated. In some embodiments, solvents that can be utilized can include chloroform ($CHCl_3$), propylene carbonate ($C_4H_6O_3$), dichloromethane ($CH_2Cl_2$), 1,2-dichloroethane ($C_2H_4Cl_2$) Surface roughness is indicative of more rigid structures while smoothness is indicative of soft structures, or mixtures thereof. Once the PHA is dissolved in a solvent and the graphene is dispersed in a solvent, they can be combined together and mixed.

In processes that utilize a solvent, the composite mixture including at least PHA, graphene, and one or more solvents can be poured into a container and the solvent(s) removed. The solvent can be removed passively, through evaporation of the solvent; or actively through heating, air flow, mixing, or a combination thereof. Solvent removal forms an article that includes PHA and graphene, as well as optional components and residual solvent(s).

In some embodiments, both methods that utilize a solvent and those that did not can include an optional step or steps after the article is formed. One such optional step can include compressing the article at an elevated pressure (from normal atmospheric pressure), an elevated temperature (from normal room temperature), or a combination thereof. This can allow the article to be formed into a film for example, as well as other shapes and articles. In some embodiments an optional step of injection molding the composite to form any desired shape or form can also be included.

In some embodiments, additional optional step (or steps) can be added to disclosed methods. For example, a step can be added to crosslink the PHA. Crosslinking the PHA can occur before or after mixing the PHA and the graphene together. For example, certain types of PHA can be chemically crosslinked and then the crosslinked rubber PHA and the graphene can be mixed. In some embodiments, crosslinking of a type that can also generate covalent bonds between the graphene and the PHA (as well as between the PHA itself) could be utilized. In some embodiments, crosslinking of a type that can generate covalent bonds between both the PHA itself and the PHA and a chemically modified graphene can be utilized.

Disclosed composites can be used to form articles that include at least PHA and graphene. Disclosed articles can have one or more desirable or advantageous properties.

In some embodiments, disclosed composites or articles made from disclosed composites can have improved or desirable mechanical properties. For example, disclosed composites can be stronger than the PHA would have been without the graphene. In some embodiments, the modulus of the composite could be higher. Articles with a higher modulus can be characterized as stiffer. Modulus can be quantified by the slope of a stress versus strain curve, for example. Disclosed articles can also be characterized as having decreased elongation at break, increased toughness (which can be quantified by the area under a stress versus strain curve), or some combination thereof. Any such mechanical properties could provide articles having desirable mechanical properties when compared with the mechanical properties of articles made only of the corresponding PHA.

In some embodiments, disclosed composites or articles made from disclosed composites can have increased electrical conductivity. Electrical conduction becomes possible when or if the $sp^2$ orbitals along the plane of the graphene overlap. As graphene loading increases the formation of continuous graphene pathways across the sample can give rise to electrical conductivity within the composite. In some embodiments, electrical conductivity can appear in disclosed composites at at least 0.5 vol % graphene. In some embodiments, electrical conductivity can appear in some disclosed composites between 0.5 vol % and 1 vol %. In some embodiments, disclosed articles having 2.5 vol % graphene can have the bulk resistivity decreased by at least a factor of 5, and in some embodiments a factor of 7, for example. Disclosed composites with additional amounts of graphene would also be electrically conductive, but could suffer from decreased mechanical properties.

In some embodiments, disclosed composites or articles made from disclosed composites can have decreased permeability. Addition of graphene to disclosed PHAs can cause a decrease in the gas permeability of an article made from the composite, for example. In some embodiments, disclosed composites or articles made from disclosed composites can have altered thermal properties as well. For example, a disclosed article that includes PHA and graphene may have an altered melting temperature or temperature degradation profile when compared with an article made from the PHA without the graphene.

In some embodiments, disclosed composites or articles made from disclosed composites can exhibit increased temperatures at which thermal degradation occurs, in comparison to the same composite or article without the graphene component. Similarly, disclosed herein are methods of increasing the temperature at which thermal degradation of PHA or a PHA containing article occurs by adding graphene. In some embodiments, disclosed composites or articles made from disclosed composites can have an altered heat capacity, in comparison to the same composite or article without the graphene component. Similarly, disclosed herein are methods of affecting the heat capacity of PHA or a PHA containing article by adding graphene.

It is thought, but not relied upon, that a possible explanation for viscoelastic properties of disclosed composites could be explained by the theory of polymer entanglements. These entanglements can form between neighboring polymer chains as well as between the polymer and the graphene. Combining graphene particles with PHA could alter the viscoelastic behavior of the PHA due to the formation of additional entanglements between the particles and the polymer chains, thereby enhancing the stiffness of the polymer matrix. While attractive intermolecular forces between the matrix and filler may contribute to the viscoelastic behavior of nanocomposites, size, shape and aspect ratio of the graphene particles could also have an influence on reinforcing effects, and the existence of molecular attraction between the matrix and graphene is not required for reinforcement to occur. The prevalent theory of this phenomenon is that non-interacting nanoparticles could block and confine the primitive paths of repeating chains, creating entanglements purely based on physical interactions.

In embodiments where interfacial forces between graphene sheets and the polymer matrix are significantly attractive, additional entanglements could originate at the interface. Transmission of stress between the matrix and the graphene surface could occur via π-π stacking, cation-π, or van der Waals interactions with available $sp^2$ networks. Modification of reduced graphene by incorporating other chemical moieties on its surface could also be used to promote interfacial attraction with a specific matrix.

Disclosed articles can be used for virtually any application. In some embodiments, the altered mechanical properties of the article can expand the applications which the composite could be utilized for. For example, improvements in polymer stiffness that may be afforded by graphene inclusion in the composite could greatly expand the useful mechanical range of PHA elastomers. In some embodiments, the addition of electrical conductivity could allow the proliferation of PHA based materials into previously unrecognized applications. Examples of such applications may include, but are not limited to, biodegradable options for packaging of charge sensitive devices, such as for example electronic circuit boards, and charge dissipating floor coverings. Because PHAs are also biocompatible the possibility may exist for the use of these materials in implantable devices or as tissue scaffolds with electrically conducting properties.

The present disclosure is illustrated by the following examples. It is to be understood that the particular examples, assumptions, modeling, and procedures are to be interpreted broadly in accordance with the scope and spirit of the disclosure as set forth herein.

EXAMPLES

Methods

Rheological properties of the pure and composite samples were determined via dynamic oscillating shear rheometery (TA Instruments, AR2000ex) using 8-mm parallel plate geometry. Strain and frequency sweeps were performed on circular disks 8×0.5 mm at a temperature of 70° C.

The mechanical properties of the pure and composite samples were measured using dynamic mechanical analyzer (TA Instruments, RSAIII). 50×5×0.5 mm specimen were tested at a strain rate of 5 mm/min. The fracture surface of the pure and composite samples were examined using SEM (Philips FEI Quanta 200 SEM) operated at a high-vacuum mode.

Dispersion of graphene within the polymer matrix was analyzed transmission electron microscopy (TEM) (JEOL, 1200 EXII). Sample with thickness of 80-100 nm for TEM imaging were prepared using an ultramicrotome (Leica, EM UC6) at −80° C.

Thermal stability was assessed by thermal gravimetric analysis (TGA) (Netzsch STA 449 F1 Jupiter). ~10 mg sample was placed in a ceramic crucible and heated from 25-600° C. at a heating rate of 20° C./min under nitrogen flow. $T_g$, $T_m$, and % crystallinity were determined by differential scanning calorimetery (Netzsch 204 F1 Phoenix). 6-10 mg of polymer nanocomposite was placed in crimped but unsealed aluminum pans and heated from −60-250° C. at a heating rate of 5°/min under nitrogen flow. All samples were aged for 72 hours prior to testing.

PHA Synthesis

Production of octane and decane polymers was achieved via fed-batch biosynthesis using the wild-type organism, *Pseudomonas oleovorans*. Initially, one fresh colony was selected and inoculated into a test tube containing 5-mL of LB medium (Tryptone 10 g, Yeast Extract Powder 5 g, and NaCl 5 g in 1 L of water) and grown overnight at 30° C. The culture was then transferred into a 2-L baffled flask with 500-mL of LB medium+1% (v/v) alkane for an additional 16 hours at 30° C. with shaking at 250 RPM. This 500-mL culture was used to inoculate a 10-L bioreactor containing 5-L of E medium+2% (v/v) alkane. E medium consisted of $(NH_4)_2HPO_4$ 1.1 g, $K_2HPO_4$ 5.8 g, $KHPO_4$ 3.7 g, $MgSO_4.7H_2O$ 0.25 g, and 1 m mL of trace metals in 1 L of water. Trace metals consisted of $FeSO_4.7H_2O$ 2.78 g, $MnCl_2.4H_2O$ 1.98 g, $CoSO_4.7H_2O$ 2.81 g, $CuCl_2.2H_2O$ 0.17 g, $ZnSO_4.7H_2O$ 0.29 g, $CaCl_2.2H_2O$ 1.67 g, 1M 1 mL in 1 L of water. Airflow and agitation were adjusted to maintain dissolved oxygen in the culture above 40%. During biosynthesis carbon dioxide evolution rate (CER) of the culture was monitored via mass spectroscopy. A sharp decline in CER indicated depletion of the carbon source, at which time more alkane was added to maintain growth. Batches were harvested at 50 hrs.

Synthesis of the octane-octene copolymer was achieved by a similar fed-batch procedure. In the first phase of the 5-L production culture, octane was used as the sole carbon source for biomass accumulation. After a decline in CER signaled the depletion of the carbon source, copolymer synthesis was initiated with a 10-mL addition of 1-octene which produced a large rise in CER. After depletion of the 1-octene CER again declined, and 50-mL of octane was added to the batch. Periodic switching of carbon sources continued every time the CER indicated carbon source depletion. Cycling was continued for 7 periods until the batch age reached 30 hr. Previous studies involving synthesis of PHA copolymers have shown that repeated cycling between different carbon sources produces a mixture of the two different polymer types with some fraction of the polymer chains expected to be di- and tri-block-copolymers.

Following biosynthesis cells were harvested via centrifugation at 10,000 RPM for 20 min. The resulting cell pellet was flash frozen in liquid nitrogen and lyophilized overnight to remove residual moisture. Polymer material was extracted from the dried cells into 1-L of boiling chloroform for 16 hr using a Soxhalet apparatus. The extract was concentrated by evaporation to 100 mL before precipitation in excess methanol, 8:1 (vol/vol). The purified polymer was dried in air to remove any excess solvent.

PHA Characterization

Purified PHAs were analyzed via gas chromatography fitted with a flame ionization detector (GC-17A, Shimadzu) using a DB-WAX column (ID 0.32 mm, 0.5 µm film thickness) (Agilent Technologies). Prior to injection, polyhydroxyalkanoic acids were converted to 3-hydroxyalkanoic propyl esters by the method of propanolyis. Quantitative determination of the different PHAs was made by comparison to standards synthesized from purified 3-hydroxyalkanoic acids (Sigma). Polymer molecular weights were determined by gel permeation chromatography using THF as the solvent.

TABLE 1

Chemical composition and molecular weight of purified polyhydroxyalkanoates.

| | Molecular Weight[a] | | Composition[b] (% wt) | | | | | |
|---|---|---|---|---|---|---|---|---|
| | $M_w$ ($10^3$ g/mol) | $M_w/M_n$ | 3HB | 3HH | $3HH_{6:1}$ | 3HO | $3HO_{8:1}$ | 3HD |
| PHO | 71 | 3.1 | 0.4 | 7.0 | — | 91.4 | — | 1.2 |
| PHOe | 54 | 2.3 | — | 4.2 | <0.1 | 89.5 | 6.1 | <0.1 |
| PHD | 57 | 2.6 | 0.4 | 6.4 | — | 61.5 | — | 31.7 |

[a]Weight average molecular weight ($M_w$), Number average molecular weight ($M_n$).
[b]3HB (3-(R)-hydroxybutyrate), 3HH (3-(R)-hydroxyhexanoate), $3HH_{6:1}$ (3-(R)-hydroxyhexenoate), 3HO (3-(R)-hydroxyoctanoate), $3HO_{8:1}$ (3-(R)-hydroxyoctenoate), 3HD (3-(R)-hydroxydecanoate)

Graphene Synthesis

Thermally reduced graphene (TRG) was produced following the thermal exfoliation method. In this method, graphite was oxidized using Staudenmaier method as follows: 5 g graphite was placed in an ice-chilled flask containing a mixture of 90 mL of $H_2SO_4$ and 45 mL of $HNO_3$. Potassium chlorate, 55 g, was slowly added to the cold reaction mixture. After 96 hr the reaction was quenched by combining the mixture with 4 L of water. The resulting graphite oxide (GO) was washed once in 5% HCl followed by additional water washes to remove the residual acid before drying overnight in a vacuum oven. TRG was produced by exfoliating the GO by rapid heating in a tube furnace (Barnstead Thermolyne) at 1000° C. under flow of nitrogen for 30 s.

Graphene Characterization

X-Ray diffraction (XRD) (X'Pert PRO MPD diffractometer, PANalytical) was used to test the oxidation of graphite and the complete exfoliation of graphite oxide. XRD scan between 5-35° was conducted at a scan rate of 0.02°/sec with instrument parameters of 40 kV voltage, 20 A intensity and 1.5406 Å CuKα radiation. Transmission electron microscopy (TEM) (FEI Tecnai G20 TEM) images of TRG were obtained with point-to-point resolution of 0.11 nm. Samples for TEM were prepared by dispersing approximately ≈0.5 mg of TRG in 25 mL of dimethylformamide by sonication at room temperature in a sonicating bath for 10 minutes. Two drops of the suspension were deposited on a 400 mesh copper grid covered with thin lacey carbon film.

Figure 2A:
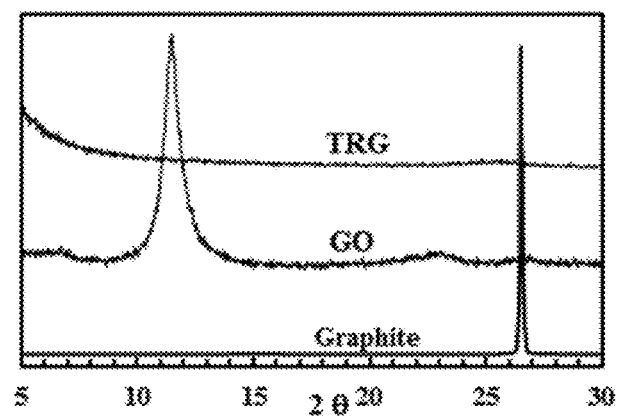
FIG. 2a shows x-ray diffraction (XRD) patterns of graphite, GO, and TRG.
Figure 2B:
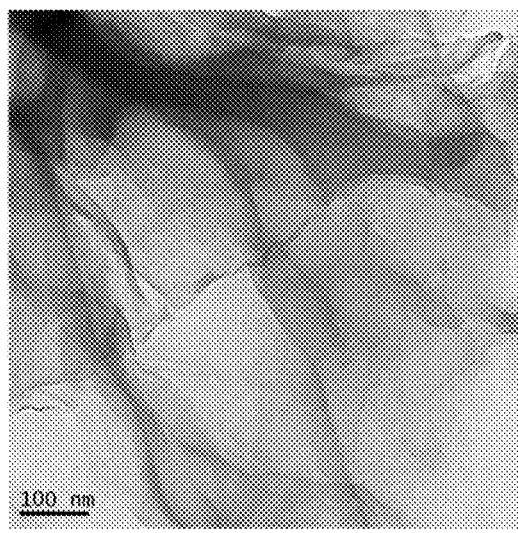
FIG. 2b shows the morphology of TRG as shown by transmission electron microscope (TEM).

In order to attain the high surface area to volume ratio possible TRG, graphite and graphite oxide structures must undergo thorough exfoliation. The completeness of exfoliation is confirmed by the use of XRD analysis. FIG. 2A shows XRD patterns for graphite, GO, and TRG. The diffraction pattern of graphite shows the strong 002 diffraction peak at $2\theta=26.5°$, d-spacing=3.37 Å. Due to the presence of the polar oxygen-containing groups on GO surface and the intercalation of adsorbed water, the 002 diffraction peak shifts to $2\theta=11.4°$ indicating the expansion of the interlayer spacing to 7.8 Å. In contrast to graphite and GO diffraction patterns, which indicate the presence of ordered layered structure, the TRG diffraction pattern shows no noticeable diffraction peaks confirming the complete exfoliation of GO and the production of non-stacked, unlayered sheets. FIG. 2B shows a TEM image of the TRG sheet Composite Preparation PHA/graphene composites were prepared by the following procedure. First, 1 g of polymer was combined with 20 mL of chloroform in a sealed tube and agitated using a vortex tube mixer. Periodic incubation of the mixture in an 80° water bath was used to promote dissolution. Second, graphene powder was dispersed in chloroform at a concentration of 0.5 mg/L. To promote the dispersion of single graphene sheets, sonication was applied to the mixture using a wand type sonicator (make and model) at a power density of 1.5-3 W/mL along with additional mixing from a magnetic stir bar. The sonicator program consisted of 28 cycles of 15 s sonication followed by a 45 s rest period. The graphene dispersion was then combined with the polymer solution and mixed with a magnetic stirrer for 1 hr. This mixture was then poured into a petri dish and evaporated on a hotplate at 55° with light stirring for ~1 hr. Films were dried overnight to remove excess chloroform.

For purposes of mechanical testing, rheology, and surface resistance measurements, thin films were prepared by hot press (Tetrahedron, MTP-10) at 100° C. and 1.0 MPa for 5 minutes. Samples were aged at room temperature for >72 hrs prior to testing. Surface resistance measurements were taken from circular disks, 10×0.5 mm, using an 11-point probe (Prostat Corp., PRF-914B probe with PRS-801 meter) For each sample, a total of 4 readings were collected, two from each side of the film.

Thin sections of composite samples, 70-100 nm, for TEM characterization were prepared without resin embedding using an ultramicrotome (Leica EM UC6) at −80° C. Samples were mounted on 200-mesh copper grids with carbon type-B coating (Ted Pella).

Thermal Stability of Composite

Figure 10:
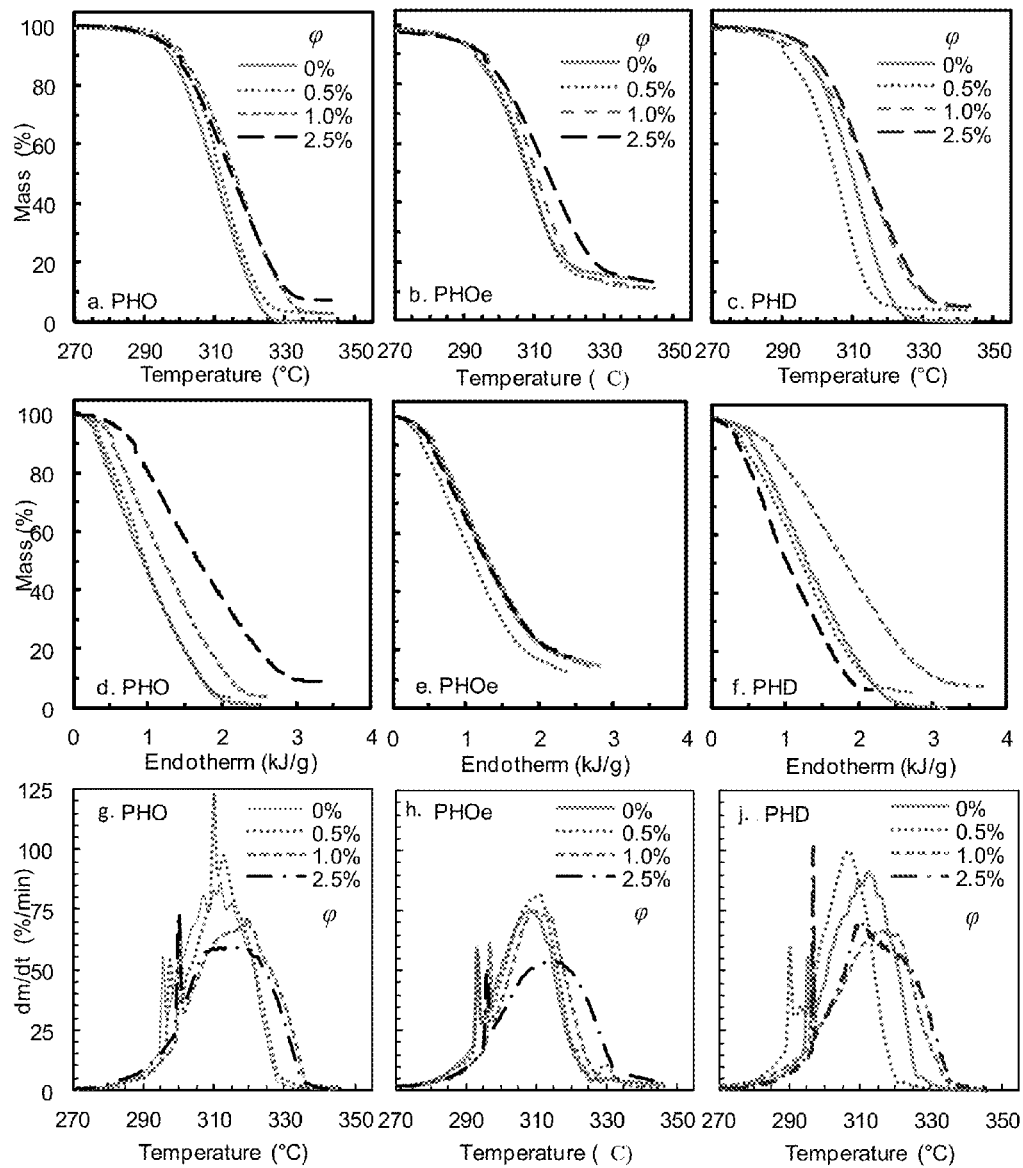
FIGS. 10a to 10j are TGA and DSC thermograms for PHA-graphene decompositions studies.

The nonoxidative thermal degradation of pure $PHA_{mcl}$ polymers and composites containing $PHA_{mcl}$ and graphene were measured between 50-350° C. Measurements were made under nitrogen flow using simultaneous thermal gravimetric analysis (TGA) and differential scanning calorimetry (DSC). FIGS. 10a to 10j are TGA and DSC thermograms for PHA-graphene decompositions studies. FIGS. 10a to 10c shows mass versus temperature, FIGS. 10d to 10f show mass versus heat-flow and FIGS. 10g, 10h, and 10j show the rate of mass loss versus temperature.

Figure 3:
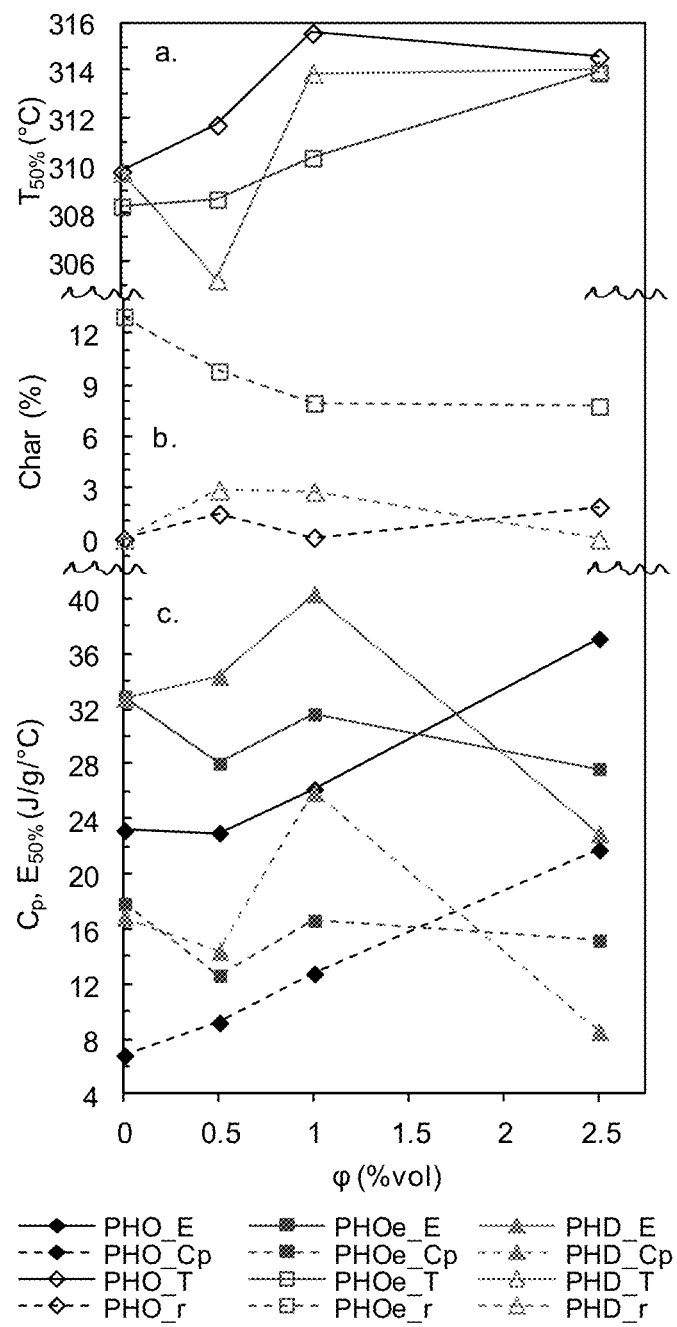
FIGS. 3a to 3c show the effects of graphene loading on different thermal properties. $T_{50\%}$ is the temperature at which 50% of the composite mass remains (FIG. 3a). $E_{50\%}$ is the total endothermic heat-load incurred during heating from 270-$T_{50\%}$° C., and $C_p$ is the specific heat capacity of the composite measured at 270° C.

FIGS. 3a to 3c show the effects of graphene loading on different thermal properties. $T_{50\%}$ is the temperature at which 50% of the composite mass remains (FIG. 3a). $E_{50\%}$ is the total endothermic heat-load incurred during heating from $270-T_{50\%}°$ C., and $C_p$ is the specific heat capacity of the composite measured at 270° C. (FIG. 3c). For easy comparison with $C_p$ values (J/g/° C.) $E_{50\%}$ values (J/g) have been scaled by the corresponding increase in temperature between $270-T_{50\%}°$ C. and are presented in units of J/g/° C. (FIG. 3c). In general, the addition of graphene increased the $T_{50\%}$ values of composites samples: at 2.5% loading $T_{50\%}$ increased by 4-6° C. One exception to this trend was the PHD-0.5% composite, which showed a decrease in $T_{50\%}$ by −4.6° C. While increases in $T_{50\%}$ indicate that the addition of graphene can improve the thermal stability of composites, $E_{50\%}$ values provide an alternative perspective. For PHD-1.0% and PHO-2.5% $E_{50\%}$ values increased by 23% and 60% respectively. This indicates improved thermal stability, because more heat is required for degradation to proceed. On the other hand, for PHOe-2.5% and PHD-2.5% $E_{50\%}$ values decreased by 16% and 30% respectively.

Some insight into this result can be gained by considering the specific heat capacity of the samples at 270° C., just prior to the onset of thermal degradation. The $C_p$ values show an obvious correlation with $E_{50\%}$ values. For PHO the addition of graphene causes a linear increase in the heat capacity of the composite samples. This could be due to an increase in the entanglement density of the composites thereby raising their capacity to store potential energy. Another storage mechanism for potential energy is the formation of hydrogen bonds between the ester groups of polymer chains and hydroxyl and carboxyl moieties on the TRG surface. As for why $C_p$ of pure PHO is lower than that of pure PHOe and PHD, it is has been shown that $C_p$ is inversely proportional to polymer molecular weight, and the $M_w$ of PHO is ~25% greater than that of PHOe and PHD. For PHOe, the addition of graphene causes a small decrease in the heat capacity of the composites. It is hypothesized that the intercalation of graphene particles within the gel network of PHOe may increase the internal strain of the matrix, thereby consuming some of its capacity to store potential energy. While the PHD-1% composite shows a large increase in heat capacity, the opposite is true for the PHD-2.5% composite. This may suggest that under some conditions entanglements with graphene may form less easily for PHD than for PHO, and instead graphene may produce a solvating effect, which reduces the entanglement density of PHD.

The strong correlation between heat capacity and the total endothermic heat-flow indicates that changes to the entanglement density of the composite can be a significant factor in controlling the thermal stability of the composites. However, the presence of graphene can provide protection against thermal decomposition by other mechanism as well. Given that graphene composites show a significant reduction in gas permeability it is likely that their presence may retard degradation by slowing the migration of volatile decomposition gases to the sample surface. Furthermore, it has been shown that the formation of a surface char layer on carbon nanocomposites can act as an additional barrier to gas evolution and may act as a protective heat shield, delaying the rise of sample temperature. Ultimately, an increase in the heat capacity of the composite requires an increase in the average kinetic energy of the material, e.g., temperature, to disrupt the physical entanglements that prevent bond breakage necessary to initiate decomposition reactions. Additionally, temperature must increase for gas particles to overcome the graphene barriers that hinder their migration to the surface. For PHO and PHD the effect of graphene on $T_{50\%}$ appear to saturate by 1% loading, and $T_{50\%}$ values for all three matrices converge to within 0.7° C. by 2.5% loading. This suggests that beyond 1% loading, the kinetics of the decomposition process are governed primarily by the barrier properties of graphene despite the varied entanglement structure of the composites.

For PHD-0.5%, which is the only composite with a reduced $T_{50}$%, it is noted that it is also the only composite with an increased $E_{50\%}$ while having a lowered $C_p$. Thus, the degradation reaction that initiates early in the decomposition of PHD-0.5% may be distinctly more endothermic, suggesting that an alternate decomposition process may be at play. Furthermore, it is noted that among all three polymer matrices the 0.5% composites show higher mass loss rates, d(mass)/dt (mass %/min) than the pure polymer matrices. Thus, it is a possibility that the oxygen-containing species on the TRG surface may cause an increase in the decomposition rate, especially if the filler loading is too sparse to hinder escaping gases.

For PHOe-0.5%, which experiences an even greater drop in heat capacity but a slight increase in $T_{50}$%, it is possible that the restriction of polymer motion due to the gel network may provide additional hindrance to gas diffusion, thereby raising the decomposition temperature.

Values for char formation are presented in FIG. 3b. Given that single layer graphene has been shown to be stable up to 2600 K, it is expected to be present as part of the residual char of the degraded composites. Thus, the final char values have been adjusted by subtracting the mass of graphene added to each composite. Note: 0.5, 1.0, and 2.5% vol graphene≈1.0, 2.5, and 5% wt. For pure PHO and PHD no residual char was observed; however, for pure PHOe ~13% char was observed. This difference may be attributed to the presence of double bonds in the PHOe structure, which could act as a source of free-radicals for the initiation of cyclization reactions that lead to the formation of char instead of more volatile compounds Physical Properties of Composite Physical transitions of pure and composite samples were measured using DSC. Values for the glass transition temperature ($T_g$), melting temperature ($T_m$), specific enthalpy of melting ($\Delta H_m$), specific entropy of melting ($\Delta S_m$), and relative crystallinity ($x_c/x_p$) are shown in Table 2 below.

TABLE 2

Physical properties of PHA-graphene nanocomposites.

| TRG Loading | Glass Transition Temperature $T_g$ (° C.) | | | Melting Temperature $T_m$ (° C.) | | | Enthalpy of Melting $\Delta H_m$ (J/g) | | | Entropy of Melting $\Delta S_m$ (J/kg·K) | | | Relative Crystallinity $x_c/x_p$ | | |
|---|---|---|---|---|---|---|---|---|---|---|---|---|---|---|---|
| φ (% vol) | PHO | PHOe | PHD | PHO | PHOe | PHD | PHO | PHOe | PHD | PHO | PHOe | PHD | PHO | PHOe | PHD |
| 0 | −41.9 | −39.3 | −48.1 | 53.7 | 50.7 | 45.2 | 15.5 | 20.9 | 22.5 | 47.4 | 64.5 | 70.8 | 1 | 1 | 1 |
| 0.5 | −38.1 | −39.8 | −48.7 | 55.7 | 43.1 | 44.9 | 13.9 | 18.7 | 15.3 | 42.3 | 59.1 | 48.2 | 0.90 | 0.89 | 0.68 |
| 1.0 | −38.6 | −39.9 | −48.8 | 55.5 | 46.8 | 48.1 | 9.0 | 20.6 | 11.1 | 27.4 | 64.4 | 34.5 | 0.58 | 0.99 | 0.49 |
| 2.5 | −39 | −38.6 | −50.7 | 54.1 | 47.2 | 47.3 | 12.2 | 19.9 | 10.1 | 37.3 | 62.1 | 31.4 | 0.79 | 0.95 | 0.45 |
| Max Change | +3.8° | +0.5° | −2.6° | +2.0° | −7.6° | +2.9° | −42% | −11% | −55% | −42% | −8% | −51% | −42% | −11% | −55% |

Among pure polymer samples, $T_m$ of PHO is higher than that of both PHOe and PHD, which is consistent with previously reported results. This may be attributed to the reduction in the crystal-forming ability of the PHOe and PHD polymers caused by disruption of the regularity of the PHO chain by 3HO$_{8:1}$ (3-(R)-hydroxyoctenoate) and 3HD (3-(R)-hydroxydecanoate) monomers. Nonetheless, the higher $T_m$ of PHO could also be attributed to its higher molecular weight. The effect of graphene on the thermal transitions is demonstrated by a small increase in the $T_m$ of PHO and PHD by ~0.5-3° C. depending on graphene loading.

These results are consistent with a similar increase in $T_m$ with graphene loading reported for other polyoxoester-graphene composites. These increases in $T_m$ for PHO and PHD may imply improved perfection in the crystalline lattice; however, this is contradictory to the decreases in $\Delta H_m$ which indicate a reduction in crystallinity. Reconciliation of this inconsistency requires consideration of the entropic effects of nanoparticle addition. Recall from thermodyanics, $T_m = \Delta H_m / \Delta S_m$. Thus, for $T_m$ to increase, the addition of graphene must cause an even greater decrease in the entropy of the phase transition. This may be due to an ordering effect of the graphene particles whereby they hinder the rotation and translation of polymer chains within confined spaces. As a necessity, the reduction in entropy must be greater in the melt phase than in solid phase.

For the case of PHOe, the decreases in $\Delta H_m$ is smaller (11%, max) compared to PHO and PHD (>42%, max). Part of the reason for this may be that PHOe contains fewer crystals that can undergo melting, due to molecular crosslinks, which obstruct crystal formation. Contrary to PHO and PHD composites, PHOe composites showed a decrease in $T_m$ by as much as 7.5° C. at only 0.5 vol. % graphene loading. Thus for PHOe the decrease in $\Delta S_m$ must be smaller than the decrease in $\Delta H_m$. To explain this alternate effect it is thought, but not relied upon, that graphene particles may be able to intercalate within the gel network of PHOe, thereby creating an isotropic strain within the polymer matrix and raising the enthalpy of the solid state. In the melt phase, however, the added enthalpy of particle intercalation would be less due to random motions in the gel network caused by thermal fluctuations. Essentially, the intercalated particles fall out when polymer movements become too large. In addition, $\Delta S_m$ would be smaller in the presence of the gel network, which could serve to maintain order among the polymer chains during the transition from solid to liquid.

The $T_g$ for pure PHD is significantly lower than that of PHO and PHOe, in agreement with an earlier report. At 0.5% graphene loading the PHO polymer displays an increase in $T_g$ of 3.8° C. while PHD and PHOe show a decrease of less than 1° C. As the second order $T_g$ transition is known to be a kinetically controlled effect, this result may suggest that the presence of graphene nanoparticles slows the motion of PHO chains by blocking reptation paths and creating entanglements. Further additions of graphene to PHO produce a minimal recovery of the $T_g$ toward its pure polymer value. For the PHD polymer, the addition of graphene causes a sustained decrease in the glass transition temperature with a maximum change of −2.6° C. at 2.5% loading. This result may suggest that in PHD, graphene particles provide a plasticization effect by increasing the free volume within the polymer matrix. This effect may be attributed to a weaker interfacial attraction between the TRG surface and PHD than with PHO. Moreover, in studies utilizing molecular dynamics simulations, researchers observed that the presence of unattractive nanoparticles in a polymer solution resulted in accelerated molecular motion near the particle surface and disentanglement of polymer chains with increasing nanoparticle loading. Because of shielding of the polyester backbone by longer aliphatic appendages it was expected that the PHD polymer would have a lower molecular affinity for the TRG surface than the PHO polymer; thus, the movement of PHD chains should have been less affected by TRG particles. For PHOe, the change in $T_g$ with loading was less significant, 1° C. This again supported the hypothesis that the presence of cross-linking in PHOe prevents the formation of additional entanglements with the graphene. Other experimental studies combining graphene based fillers with related polyoxoesters have reported both increases and decreases in $T_g$.

Without reference data for the specific enthalpy of melting of pure PHA crystals ($\Delta H_m^0$) the absolute crystallinity of a sample ($x = \Delta H_m / \Delta H_m^0$) cannot be determined from DSC endotherms. However, the specific enthalpy of melting ($\Delta H_m$) data may still be used to infer changes in the relative crystallinity of the composite compared to the crystallinity of the pure polymer. If $x_c$ is the fraction of crystals in the composite and $x_p$ is the fraction of crystals in the pure polymer, then the relative crystallinity of a composite sample ($x_c/x_p$) may be estimated as $x_c/x_p = (\Delta H_m^c / \Delta H_m^0)/(\Delta H_m^p / \Delta H_m^0) = \Delta H_m^c / \Delta H_m^p$. Thus, the addition of graphene to PHO and PHD causes a decrease in the relative crystallinity of the composites to 0.79 and 0.45, respectively, at 2.5% graphene. For PHOe the reduction in crystallinity is minimal, 0.95. The significant increases in the amorphous fraction of PHO and PHD show that the presence of graphene-polymer entanglements may create a significant hindrance to chain movement and crystal formation. For PHOe the minimal change in crystallinity compared to PHO suggests that the pure PHOe matrix may already be more amorphous, thereby giving support to the hypothesis of a super-molecular network in PHOe. Moreover, the presence of covalently bonded polymer-polymer entanglements in PHOe likely precludes the formation of polymer-graphene entanglements. Similar reductions in the enthalpy of melting and/or crystallization have been observed for various PHA composite systems including: PHB with exfoliated graphite nanoplatelets, PHB-co-PHV (13% PHV) with microwave expanded graphite, PHB with organo-modified montmorillonite clay (organo-MMT), and PHB-co-PHV (4% PHV) with organo-MMT.

Rheological Properties of Composite

Figure 4:
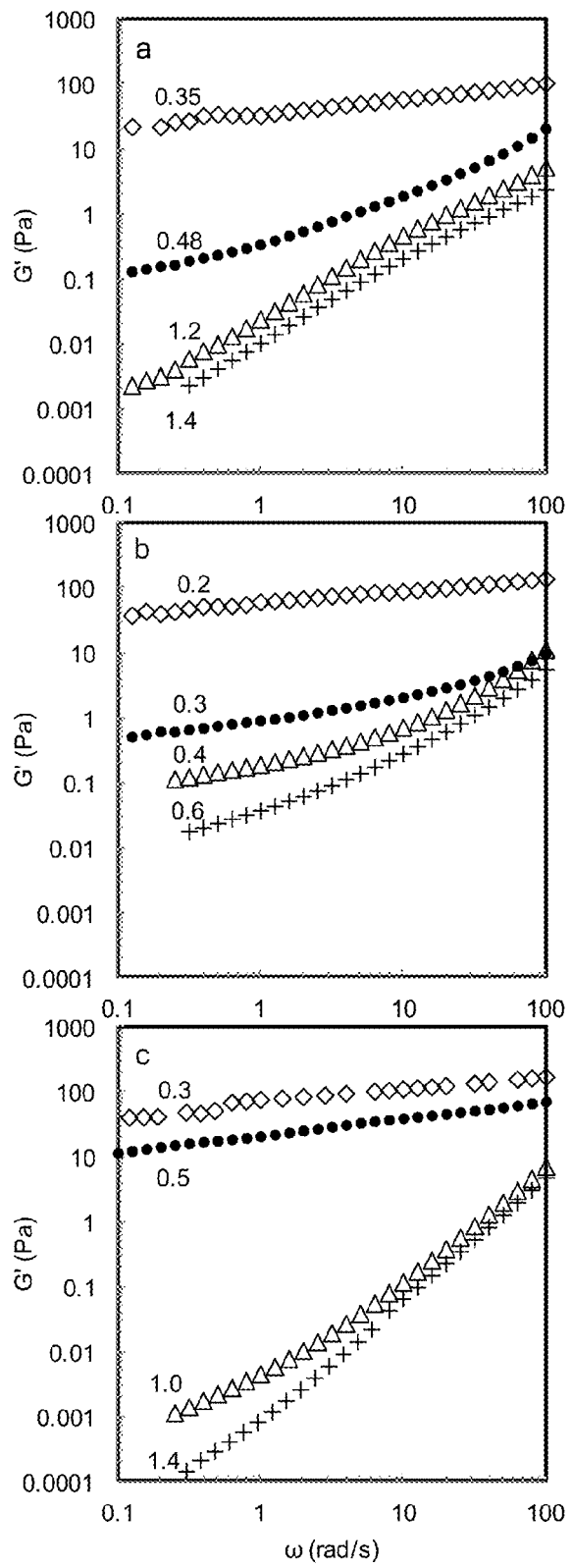
FIGS. 4a, 4b, and 4c show frequency sweep profiles for polymer/graphene composites with different graphene loadings (FIG. 4a PHO/graphene.

In order to determine the elastic (G') and viscous (G") moduli of the illustrative composite materials in the melt phase, samples were investigated using oscillatory shear rheometry at 70° C. Frequency sweep profiles for the pure and composite samples are presented in FIG. 4. Data for the pure polymer samples indicates that PHOe has the highest G' followed by PHO then PHD. It is thought, but not relied upon that the higher modulus of PHO compared to that of PHD may be due to a greater entanglement density of polymer chains i.e., lower molecular weight between entanglements ($M_e$), in the PHO matrix. $M_e$ is known to vary with the cube of the chain packing length (p), and p has a quadratic dependence on the cross-sectional diameter of the polymer chain. Because 3HD monomers in PHD increase the cross-sectional area of the polymer chain, the packing length of the PHD chain may be expected to be greater. As a result, $M_e$ for PHD may be expected to be greater, and its propensity to form entanglements may be expected to be reduced. Thus, PHO chains with their smaller cross-section may be expected to form more entanglements, leading to a greater modulus than less entangled PHD chains.

For PHOe, the presence of double bonds stemming from its aliphatic appendages permits the formation of chemical cross-links between adjacent chains, thereby leading to a greater elastic modulus than the PHO and PHD polymers. Polyhydroxyalkanoate polymers have been synthesized from octane and octene and have been subjected to varying intensities of electron-beam radiation to promote cross-linking Samples from that polymerization and cross-linking that were presumed to have a higher degree of cross-linking showed increased modulus values. Thus, in the melt phase where crystallinity does not contribute to the modulus, the network connectivity provided by cross-linking in the PHOe polymer may be responsible for the higher G' for PHOe and the onset of a rubbery plateau at low frequencies, compared to PHO and PHD which have lower values of modulus and display behavior characteristic of the terminal regime.

Values previously observed for the crossover frequency, ($\omega_c$), where the storage modulus (G') is equal to the viscous modulus (G"), show an inverse power-law dependence upon $M_w$, specifically $\omega_c = (M_w)^{-3.7}$ for LLDPE. In the instant studies, $\omega_c$ was found to be ~70 rad/s for PHO and ~40 rad/s for PHOe. Data for G" not shown. Both matrices had a similar value for the crossover modulus of ~1.5 Pa. This difference in $\omega_c$ values may suggest that the $M_w$ of PHOe is greater than that of PHO. But GPC results showed that the $M_w$ of PHO was 71K Da while that of PHOe was 54K Da. This could be interpreted as another indication of cross-linking in the PHOe matrix, thereby increasing the apparent $M_w$ of linked polymer chains.

In FIG. 4a data for the PHO-graphene composites is presented. As graphene loading increased, G' increased and the slope of the G' versus ω curve began to decrease in the low frequency region. For purely elastic materials, G' was invariant with respect to changes in the frequency of the applied strain, i.e. the slope of G' versus ω goes to zero. Thus, the reduction in slope of G' versus ω at high graphene loadings indicated the emergence of elastic behavior due to the presence of a solid-like network structure within the composite. Similar results were obtained for PHOe and PHD, FIGS. 4b and 4c. While there was a significant difference in G' of the pure polymers, all three polymers begin to show a definite elastic response by 1% loading, and the differences in G' are almost indistinguishable by 2.5% loading. This may suggest that a network of particle-particle interactions dominated the rheology at high loadings while polymer-particle entanglements conferred elasticity at lower loadings.

Values for storage modulus may also be used to predict the critical filler loading ($\phi_c$) at which percolation of a pseudo-solid network may first occur. Using a slightly modified, power-law model of the form $G'=G'_g((\phi-\phi_c)/(1-\phi_c))^\nu$, which includes a boundary condition for the shear modulus of few-layer graphene ($G'_g$) (~1×10$^{11}$ Pa), the graphene loadings at which network percolation first occurs were calculated. See Table 3.

TABLE 3

Model Parameters for Power-law fit to Storage Modulus (G') and Electrical Conductivity ($\sigma$) Data

|  |  | PHO | PHOe | PHD |
|---|---|---|---|---|
| G' | $\phi_c$ (vol. %) | −0.1 | −0.8 | 0.33 |
|  | $\nu$ | 6.0 | 6.3 | 5.0 |
|  | $^a r^2$ | 0.999 | 0.999 | 0.979 |
| $\sigma$ | $\phi_c$ (vol. %) | 0.48 | 0.40 | 0.44 |
|  | $\nu$ | 4.3 | 5.0 | 5.0 |
|  | $^a r^2$ | 0.999 | 0.991 | 0.995 |

$^a r^2$ values from linear regression analysis.

The negative signs for PHO and PHOe percolation limits arise from error on estimates of $\phi_c$ very near zero. Moreover, despite the negative signs, the numeric ordering of the values remain meaningful for predicting the relative sensitivity of each matrix to graphene inclusions. Practically, values for the percolation threshold≤0 imply that increases in modulus may be realized immediately, upon the smallest addition of filler. This makes sense given that virgin polymer matrices already form a network of entangled polymer chains, whereby stress created by the inclusion of one graphene particle may be transmitted to an adjacent particle, even if the two particles are not in direct contact. Because PHOe already contains a sample-spanning network of covalent cross-links, it is the most sensitive to graphene inclusions and has a $\phi_c$ lower than PHO. Alternatively, PHD, which is less likely to participate in molecular entanglements due to its greater packing length and reduced chain length, has a $\phi_c$ higher than PHO.

Mechanical Properties of Composite

Figure 5:
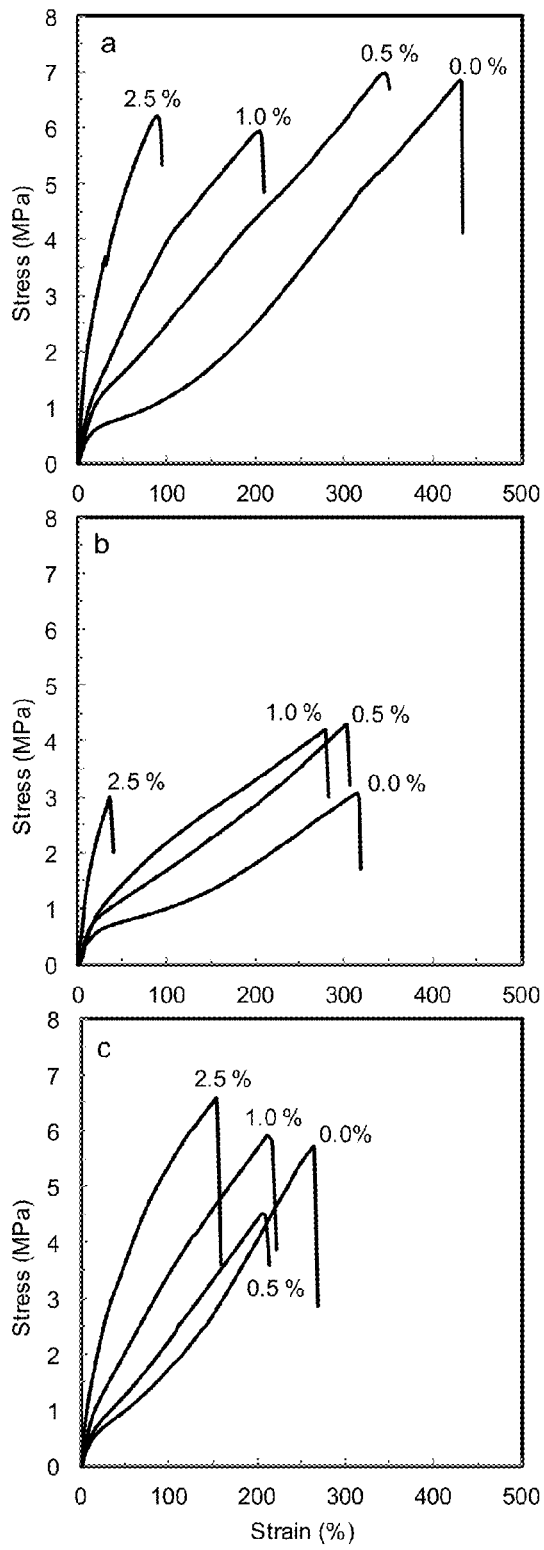
FIG. 5 is the stress-strain curves for polymer/graphene composites with different graphene loadings (FIG. 5a PHO/graphene.

The ability of graphene to reinforce a PHA matrix may improve as the attractive molecular forces between the graphene particles and the matrix become stronger. At graphene loadings below the percolation threshold (e.g., low graphene loadings), this enhancement may be caused by the ability of the graphene particles to promote a greater level of polymer entanglement. At graphene loadings beyond the percolation threshold (e.g., high graphene loadings), a continuous graphene network begins to emerge which may be capable of direct reinforcement of the polymer matrix. Both effects increase as the attractive molecular forces between the graphene particles and the polymer chains become stronger. FIG. 5 shows stress-strain curves for the different composites, while tabular values for Young's modulus (E), ultimate strength ($\sigma$), and elongation at break ($\epsilon$) are presented in Table 4 below.

TABLE 4

Mechanical properties of PHA-graphene nanocomposites.

| TRG Loading | Young's Modulus E (MPa) | | | Ultimate Strength $\sigma$ (MPa) | | | Elongation at Break $\epsilon$ (%) | | |
|---|---|---|---|---|---|---|---|---|---|
| $\phi$ (% vol) | PHO | PHOe | PHD | PHO | PHOe | PHD | PHO | PHOe | PHD |
| 0 | 4.5 | 6.3 | 5.3 | 6.4 | 4.2 | 5.7 | 425 | 316 | 263 |
| 0.5 | 7.2 | 6.9 | 5.7 | 7 | 4.3 | 4.5 | 346 | 302 | 209 |
| 1.0 | 10.9 | 8.5 | 11.8 | 5.6 | 3.9 | 5.9 | 204 | 293 | 212 |
| 2.5 | 31 | 18.8 | 20.1 | 6.7 | 3 | 6.6 | 105 | 34 | 155 |
| Max. Change | 590% | 200% | 280% | 9% | 2% | 16% | −75% | −89% | −41% |

The stress-strain profile of pure PHO, PHOe, and PHD is typical of elastomeric polymers and can be characterized by three distinct regions: an initial high-modulus region ($\epsilon$<~10%), plastic deformation region (~10%<$\epsilon$<~50%), and a strain hardening region (~50%<$\epsilon$<~200-300%) before fracture at ($\epsilon$>~300-450%) The increased strain at break observed for the pure PHO polymer, 450%, versus 325% for PHOe, and 275% PHD may likely be due to the higher molecular weight of the PHO polymer, or more specifically, polymer chains must reptate further to break their initial entanglements.

Figure 7:
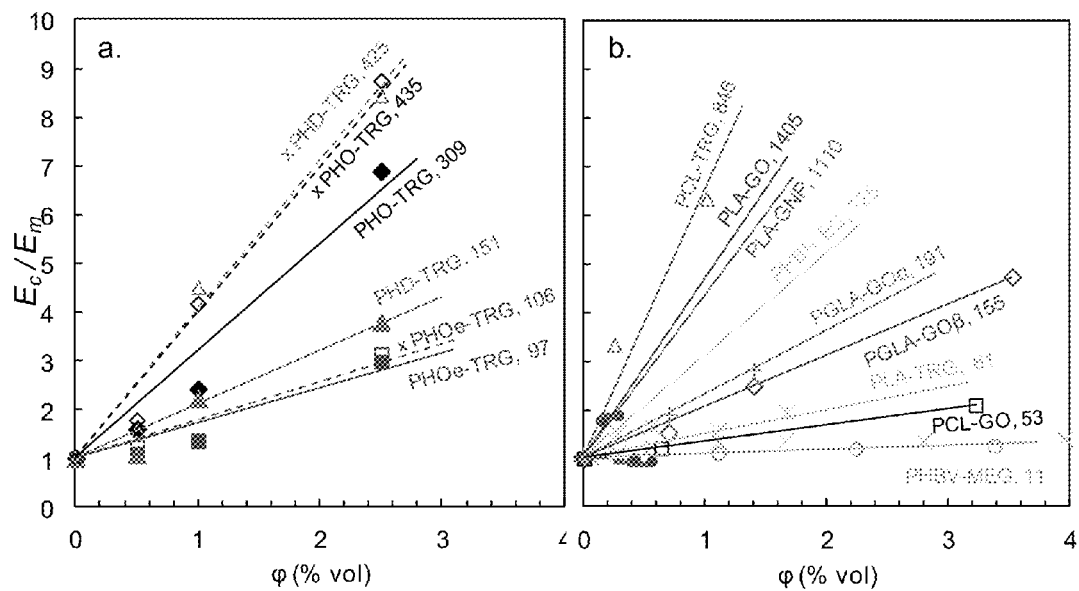
FIG. 7 shows variation in the normalized modulus, $E_C/E_P$, with increasing graphene loading.

For composite samples, the addition of graphene may lead to a significant increase in the Young's modulus. Normalization of modulus values as $E_c/E_m$, where $E_c$ is the modulus of the composite and $E_m$ is the modulus of the pure matrix, allows equal comparison among the different matrices. FIG. 7 shows a plot of the normalized moduli for increasing graphene loadings. Modulus enhancement is greatest for PHO, 1.6-6.8, lower for PHD, 1.1-3.8, and lowest for PHOe 1.1-3.0. The seeming disparity among the different matrices is discussed in a later section. On the other hand, changes in ultimate strength seem less significant, and seem to have minimal correlation with graphene loading. In contrast to modulus values, which increase with graphene loading, values for the elongation at break decrease by a maximum of 41-89% at the 2.5% loading. At this maximum loading, the PHD polymer permits the greatest strain before break, 155%, versus 105% for PHO and 34% for PHOe. This may be due to the reduced packing length of the PHD polymer, which may allow it to disentangle more easily before reaching its ultimate strength. Regardless of the decrease in elastic range, all composite samples experience a reasonable elongation before break such that they do not become brittle.

Interestingly, it is noted that strain increases beyond the plastic deformation region, so that all composite samples extend with a modulus similar to that of their corresponding pure polymer. This implies that reptating chains eventually escape from their graphene-associated confinements by either disengaging their initial graphene entanglements or by a strain-induced alignment of graphene sheets whereby sliding chains are less likely to encounter new graphene obstacles.

While graphene may enhance the modulus of the PHA polymers by 200-590% at 2.5% loading, the effect may be even more significant if the decrease in crystallinity is considered. Given that the modulus of a polymer crystal is typically several orders of magnitude greater than the modulus of the amorphous material, the presence of small crystals can alter the mechanical properties of a material similar to the effect of nanoparticle fillers. For example, studies have reported a positive correlation between increases in crystallinity and increases in modulus. Furthermore, the same micromechanical theory used for composite materials has been used to model the behavior of semi-crystalline polymers. At 2.5% loading, the relative crystallinity of PHO, PHOe, and PHD composites compared to the pure polymers may be reduced to 0.79, 0.95, and 0.45, respectively; thus, by this effect it would be expected that the composites may have a lower modulus than the pure polymers.

To account for the effects of reduced crystallinity, an alternate estimate of the modulus enhancement factor as $(E_c/E_m)/(x_c/x_p)$ can be made. FIG. 7 contains a plot of the normalized moduli versus graphene loading, with and without the correction for crystallinity. While there is a significant difference between PHO and PHD for the uncorrected modulus enhancement, the results are almost identical when crystallinity is considered. This alternative estimate suggests that the dispersion and molecular interactions of PHO and PHD with TRG are more similar than originally thought. For PHOe the effect of crystallinity on modulus enhancement is negligible.

Electrical Conductivity of Composite

Figure 6:
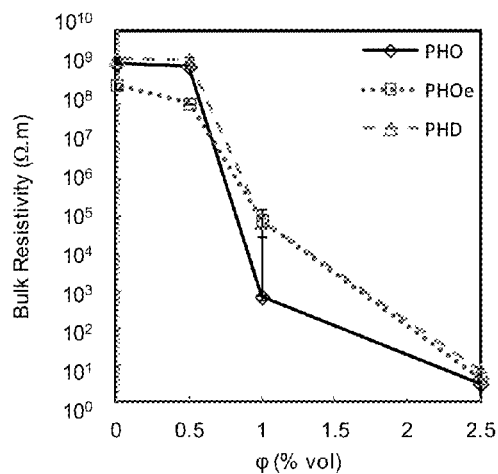
FIG. 6 shows bulk resistivity of PHA/graphene composites for various graphene loadings.

The ability of graphene to impart electrical conductivity to a PHA matrix is another interesting property. Electrical conduction may be possible due to the overlap of $sp^2$ orbitals above the plane of the graphene monolayer. FIG. 6 shows the bulk resistivity ($\rho$) of PHA-graphene composites for various graphene loadings. Just before a graphene loading of 0.5%, the formation of a few, continuous, graphene pathways begins to produce a small drop in the resistivity of the composite. By $\phi=2.5\%$, the bulk resistivity in all three PHA matrices is decreased by >7 orders of magnitude.

Figure 11:
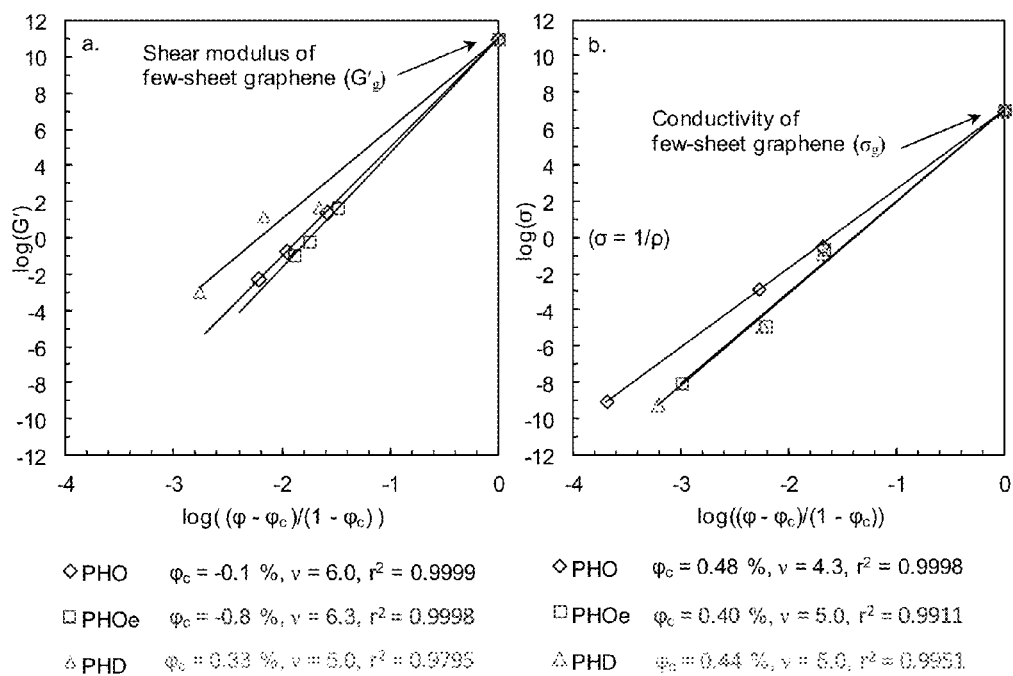
FIG. 11a shows the rheology data fitted to the model $G'=G'_g((\phi-\phi_c)/(1-\phi_c))^v$. G' values correspond to a shear rate of $\omega=0.3$ rad/s.
FIG. 11b shows the electrical conductivity data fitted to the model $\sigma=\sigma_g((\phi-\phi_c)/(1-\phi_c))^v$.

A more accurate estimate of the electrical conductivity percolation threshold ($\phi_c$) may be made by employing a power-law model of the form $\sigma=\sigma_g((\phi-\phi_c)/(1-\phi_c))^\nu$, where $\sigma_g$ is the conductivity of few-layer graphene, and $\nu$ is the "universal constant" for which classical models specify a theoretical value of 2 for geometric percolation. Using this model, the graphene loading at which percolation of an electrically conducting network first occurs was calculated using linear regression procedures used for the rheological model. Using this model, the percolation of an electrically conducting network occurs at filler loadings of 0.48, 0.40 and 0.044 vol % with $\nu$ values of 4.3, 5.0, and 5.0 for PHO, PHOe, and PHD respectively. FIG. 11a shows the rheology data fitted to the model $G'=G'_g((\phi-\phi_c)/(1-\phi_c))^\nu$. G' values correspond to a shear rate of $\omega=0.3$ rad/s. FIG. 11b shows the electrical conductivity data fitted to the model $\sigma=\sigma_g((\phi-\phi_c)/(1-\phi_c))^\nu$.

The results are shown in Table 3 above. The $\phi_c$ values for electrical conductivity are distinctly greater than those predicted for rheological percolation and are much more similar among the different polymer matrices. In rheological and mechanical testing of nanocomposites, improvements in modulus may actually arise before formation of a continuous filler phase due to the aid of polymer entanglements that link distant particles. For this reason, measurements of electrical conductivity are better indicators of geometric network percolation. However, the $\phi_c$ values predicted from conductivity data may still be below the threshold for true geometric percolation, as the corresponding estimates of $\nu$ are all greater than the classical value of 2. Such high $\nu$ values have been attributed to quantum tunneling effects, which can permit conductivity between proximal, but non-touching particles. By analogy, the similarly high values of $\nu$ obtained from the rheology percolation models support the hypothesis that polymer entanglements between particles confer network structure well before geometric percolation. Moreover, the wide range of $\phi_c$ values for rheological percolation, -0.8-0.33% vol, may indicate significant variation in the molecular interactions of the TRG particles with the different PHA matrices.

Evaluation of Composite Structure

Composite structures may be described with respect to properties of the nanoparticles, e.g. size, aspect ratio, and dispersion, as well as properties of the polymer entanglements within the matrix, e.g. size and density of entanglements. Direct methods of evaluation may include spectroscopy and microscopy while indirect methods use rheological, mechanical, or electrical conductivity measurements to infer structure.

The aspect ratio ($A_f$) and particle dispersion may be estimated from electrical conductivity. According to percolation theory for electrically conducting networks, fillers with elongated or expanded geometry such as fibers or sheets possess a lower $\phi_c$, because they can more readily form a continuous network in a polymer matrix. Moreover, percolation arises most quickly when the particles are distributed in completely random orientations. Thus, $\phi_c$ for a composite system conveys information about the aspect ratio of the particles as well as their orientation.

For a nanoparticle, the aspect ratio ($A_f$) is defined as the average diameter of the particle (d) divided by its thickness (t). Crumpling or breaking of graphene particles during exfoliation causes a direct reduction in $A_f$ while particle aggregation, poor dispersion, and strain induced particle alignment during secondary processing can indirectly cause a reduction in the effective $A_f$.

Assuming a completely random orientation of the nanoparticles, several mathematical models have been proposed to relate $\phi_c$ to $A_f$. One semi-empirical estimation (referred to as Ren in Table 5) predicts the percolation loading as $$\phi_c = \frac{3\phi_c^s}{2A_f},$$

where $\phi_c^s$ is the percolation volume fraction of spherical particles ($\phi_c^s=0.3$). A more rigorous model (referred to as Celzard in Table 5) predicts percolation loading to be bounded between $$\phi_c = 1 - \exp\left(-\frac{3.6}{\pi A_f}\right)$$

and $$\phi_c = 1 - \exp\left(-\frac{5.6}{\pi A_f}\right)$$

for an infinitesimally thin spheroid and a perfect sphere, respectively. On the other hand, a third model (referred to as Lu in Table 5) predicts $$\phi_c = \frac{2.154}{A_f}.$$

Using the values for $\phi_c$ obtained from conductivity data, values of $A_f$ calculated from the different models are provided in Table 5 below. The average aspect ratios of all three models is $A_f^{PHO}=288$, $A_f PHOe=345$ $A_f^{PHD}=314$. The similarity in these values indicates that at low graphene loadings there is little difference in the geometry or dispersion of graphene in the three different matrices.

TABLE 5

Prediction of particle aspect ratio ($A_f$) determined from the percolation threshold for electrical conductivity ($\phi_c$).

| | $\phi_c$ | $A_f$ | | | |
|---|---|---|---|---|---|
| | (% vol) | Ren | Celzard[a] | Lu | Avg. |
| PHO | 0.48 | 94 | 238-370 | 449 | 288 |
| PHOe | 0.40 | 113 | 286-445 | 539 | 345 |
| PHD | 0.44 | 102 | 260-404 | 490 | 314 |

[a]Lower and upper bounds correspond to oblate and spherical limits.

The aspect ratio ($A_f$) and particle dispersion may also be estimated from modulus enhancement. According to micromechanical theory the enhancement of mechanical properties in composite materials is strongly impacted by both $A_f$ as well as particle orientation. Particles with large aspect ratios, such as graphene sheets and carbon nanotubes, produce a greater increase in modulus than spherical ones. When a collection of randomly dispersed graphene particles are all oriented in the same direction, modulus enhancement is maximum and points in the direction normal to the graphene surface. Alternatively, when the orientation of particles is completely random, modulus enhancement is reduced, but the property becomes isotropic. Unlike the percolation of electrical conductivity, increases in modulus can occur even when reinforcing particles do not form a continuous network. An alternate technique to estimate the $A_f$ and orientation of nanoparticles within a polymer matrix is by using micromechanical equations. These equations describe the enhancement in modulus of a polymer matrix due to the addition of small filler particles in the form of either oblate or prolate spheroids with varying degrees of $A_f$. The equations are used in conjunction with experimental data for $E_c/E_m$ versus $\phi$, where $E_c$ is the composite modulus, $E_m$ is the pure polymer modulus, and $\phi$ is the volume fraction of filler within the composite. Values for the filler modulus ($E_f$), and Poisson ratio of the matrix and the filler ($v_m$, $v_f$) are also required for the calculations.

The aspect ratio can also be predicted using a theoretical model. A theoretical model for determining the average stress in a composite matrix with misfitting inclusions was first proposed by Mori and Tanaka utilizing the transformation tensor for a single inclusion derived previously by Eshlby. Based on these results Tandon and Weng derived analytical expressions for the longitudinal ($E_{11}$) and traverse ($E_{22}$) moduli of a composite matrix for the hypothetical case of perfectly aligned inclusions. In addition to the general case of spherical inclusions, they expanded their derivation to include the effect of both oblate spheroids, e.g. graphene nanoparticles, and prolate spheroids, e.g. graphene nanotubes, of varying aspect ratio ($A_f$). In the hypothetical case of perfectly aligned inclusions, the longitudinal modulus ($E_{11}$), which points in the direction normal to the flat plane of an oblate nanoparticle, takes on a maximum, and the traverse modulus ($E_{22}$) assumes a minimum. Thus when a collection of nanoparticles is dispersed in a completely random orientation, the traverse modulus ($E_{22}$) takes on a maximum value and becomes equal to $E_{11}$. According to Tandon and Weng, the traverse modulus of the composite is a function of the loading volume of filler particles ($\phi$), their aspect ratio ($A_f$), and the Young's modulus (E) and Poisson ratio (v) for both the filler particles and the matrix ($E_m$ and $E_f$) and ($v_m$ and $v_f$).

$$\frac{E_{22}}{E_m} = \frac{1}{1 + \frac{\varphi[-2v_m A_3 + (1-v_m)A_4 + (1+v_m)A_5 A]}{2A}}$$

The contributions of these parameters are contained within the coefficients, A, $A_3$ $A_4$ and $A_5$, the formulas for which are quite detailed and may be found in the original article by Tandon and Weng[9]. For purpose of calculations $E_{22}$ is assigned value of Young's modulus measured for the composite ($E_c$) Thus, using the slope obtained from a plot of $E_c/E_m$ versus $\phi$, an estimate can be made for the value of $A_f$.

For most reports in the literature, graphene content was given in wt %; thus, estimates for the filler and matrix mass densities ($\rho_f$ and $\rho_m$) were used to calculate the corresponding loading volume in vol %. For graphene oxide (GO) a value of $\rho_f=1.8$ kg/m$^3$ was used. For all other nanofillers the density assumed was that of graphite, $\rho_f=2.28$ kg/m$^3$. Mechanical properties of the nanofillers were assumed to be the same as those of pristine graphene, $E_f=1060$ GPa and a Poisson ratio of, $v_f=0.186$. When possible, values for the Poisson ratio of the matrix ($v_m$) were obtained from the literature. For PHO, PHOe, and PHD a value of $v_m=0.49$ was assumed based on a Poisson ratio of 0.5 corresponding to a perfect elastomer. For PGLA a value of $v_m=0.33$ was assumed based on the similar value of $v_m=0.36$ for PLA.

For each composite system data for $E_c/E_m$ versus $\phi$ was fitted to a linear model using least-squares regression. In most cases reinforcement effects were best at low filler loadings, but plateaued at higher levels, likely due to difficulty in dispersing the filler particles at higher volume loadings. Thus, to obtain a maximum value of $A_f$, slopes of $E_c/E_m$ versus $\phi$ were calculated using only the first three data points of each set, including the 0% loading. In some cases additional data points were included if doing so resulted in a higher estimate of slope. Computations were performed using a Matlab code. The calculated values of $A_f$ for each composite and the parameter values used in the calculations are presented in Table 6 below.

TABLE 6

Parameters used for calculation of aspect ratio ($A_f$) for various composites.

| Polymer | Graph. Type | Matrix Modulus $E_m$(MPa) | Matrix Density $\rho_m$ (g/mL) | Matrix Poisson Ratio $v_m$ | Slope m | Calculated Aspect Ratio $A_f$ |
|---|---|---|---|---|---|---|
| PHO | TRG | 4.5 | 1.02 | 0.49 | 3.193 | 309 |
| PHOe | TRG | 6.3 | 1.02 | 0.49 | 1.714 | 97 |
| PHD | TRG | 5.3 | 1.02 | 0.49 | 2.099 | 151 |
| PHBH | EG | 292 | 1.22 | 0.39 | 3.104 | 325 |
| PHBV | MEG | 85.7 | 1.22 | 0.39 | 1.089 | 11 |
| PLA | GNP | 1800 | 1.25 | 0.36 | 4.339 | 1110 |
| PLA | TRG | 3000 | 1.25 | 0.36 | 1.496 | 81 |
| PLA | GO | 1800 | 1.25 | 0.36 | 4.676 | 1405 |
| PCL | TRG | 107 | 1.14 | 0.47 | 6.513 | 846 |
| PCL | GO | 340 | 1.14 | 0.47 | 1.389 | 53 |

TABLE 6-continued

Parameters used for calculation of aspect ratio ($A_f$) for various composites.

| Polymer | Graph. Type | Matrix Modulus $E_m$(MPa) | Matrix Density $\rho_m$ (g/mL) | Matrix Poisson Ratio $v_m$ | Slope m | Calculated Aspect Ratio $A_f$ |
|---|---|---|---|---|---|---|
| PLGA | GO | 110 | 1.35 | 0.33 | 2.302 | 191 |
| PLGA | GO | 203 | 1.35 | 0.33 | 2.049 | 155 |

FIGS. 7a and 7b are plots of $E_c/E_m$ versus $\phi$ for the composites in this study as well as comparative composites (the comparative systems considered include: poly(3-(R)-hydroxybutyrate)-co-poly(3-(R)-hydroxyhexanoate) (PHBH, 13% 3HH) with expanded graphite (EG), poly(3-(R)-hydroxybutyrate)-co-poly(3-(R)-hydroxyvalerate) (PHBV, 13% 3HV) with microwave expanded graphite (MEG), polylactide (PLA) with graphene nanoplatelets (GNP), graphite oxide (GO), or thermally reduced graphene (TRG), poly($\epsilon$-caprolactone) with TRG or GO, and polyglycolide-co-polylactide (PGLA, 50% lactide) with GO). The nancomposites are depicted in FIG. 7 (with the left part of the graph designated as FIG. 7a and the right part designated as FIG. 7b and each using the following: PHO-TRG (♦), PHOe-TRG (■), PHD-TRG (▲), xPHO-TRG (◊), xPHOe-TRG (□), xPHD-TRG (Δ). "x" before the abbreviation denotes data corrected for reduced crystallinity. b.) Nanocomposites in the literature: PLA-GO (●), PLA-GNP (—), PHBH (*), PLA-TRG (x), PHBV-MEG (○), PGLA-GO$^\alpha$ (+), PGLA-GO$^\beta$ (◊), PCL-TRG (Δ), PCL-GO).

Calculations predict: $A_f^{PHO}$=309, $A_f^{PHOe}$=97, $A_f^{PHD}$=151. The value of $A_f^{PHO}$ predicted by this method is similar to the ones predicted by percolation theory, while the values for $A_f^{PHOe}$ and $A_f^{PHD}$ are significantly smaller. However, when the modulus enhancement values are corrected for crystallinity, the resulting $A_f$ values are, $A_f^{PHO}$=435, $A_f^{PHOe}$=106, $A_f^{PHD}$=425. This suggests that the behavior of the PHO and PHD matrices are actually, very similar. For PHOe, the lower value of $A_f$ predicted by modulus enhancement compared to percolation theory, suggests that the presence of covalent cross-links somehow prevents stress transmission to the graphene particle The derivation used by Tandon and Weng to describe the effect of nanoparticle inclusions assumes 1.) that the mechanical properties of the bulk polymer matrix are completely homogeneous and 2.) that particle inclusion do not alter the mechanical properties of the bulk matrix e.g., by changing the crystallinity or entanglement density. However, the decreases in $\Delta H_m$ that are seen with graphene addition indicates that crystallinity is indeed affected by graphene addition.

Estimation of $A_f$ using the equations of Tandon and Weng involves estimating an average modulus enhancement factor $(E_c/E_m)_{avg}$ by fitting modulus enhancement data to a linear approximation dependent on the dimensionless, volumetric, filler fraction, $\phi$.

$$E_c/E_m = \phi^*(E_c/E_m)_{avg.}+1$$

By recognizing the physical analogy between reinforcement with nanofiller and reinforcement with polymer crystals, we have adopted a similar model of crystal reinforcement assuming a linear expression of the form:

$$E_c/E_m = (x_c/x_m)^*(1-(E_a/E_m))+(E_a/E_m)$$

dependent on a dimensionless, relative crystallinity ($x_c/x_m$) and the modulus of the purely amorphous polymer ($E_a$). While the quantity $E_a/E_m$ is specific for each polymer system, in the case of $E_a/E_m \ll 1$ the relation becomes independent of polymer type, giving the simplified form:

$$E_c/E_m \approx (x_c/x_m)$$

Previous results have shown that for a similar PHO polymer the measured $E_m$ for a semi-crystalline matrix was more than 100×> than the corresponding $E_a$ of the amorphous material. The instant inventors have reported similar values of $E_m$ of 4.5 MPa and 5.3 MPa for PHO and PHD respectively. Based on this and the similar composition between PHO and PHD it is assumed that $E_a/E_m$ for PHD is of the same, negligible magnitude. Furthermore x-ray crystallography performed on PHO and PHD polymers showed a very similar crystalline structure, which supports the assumption that reinforcement effects by PHO and PHD crystals are similar. Thus, it is expected that the linear approximation for crystallinity utilized herein imparts minimal inaccuracy for comparing PHO and PHD.

Because the relative modulus enhancement is proportional to both graphene content as well as crystal content, a combination model of the form seen below can be used:

$$E_c/E_m = (\phi^*(E_c/E_m)_{avg.}+1)^*(x_c/x_m)$$

It should be noted that the model gives the correct value of $E_c/E_m$=1 when $\phi$=0 and $x_c$=$x_m$. Thus, the modulus enhancement factor corrected for crystallinity becomes.

$$(E_c/E_m)/(x_c/x_m) = (\phi^*(E_c/E_m)_{avg.}+1)$$

While a more rigorous derivation could be made, this simplified model highlights the important effects that changes in matrix crystallinity can have on modulus enhancement when using nanofiller reinforcements.

While the explanation of crystallinity seems to account for the difference in modulus between PHO and PHD, it is noted that the pull-out morphology seen in SEM images of PHO and PHOe fracture surfaces is not seen in PHD. Also, PHO and PHOe experience a 75% and 89% reduction in $\epsilon$ at 2.5% graphene loading, while for PHD the reduction in $\epsilon$ is only 41%. This suggests that under high stresses, PHD may relinquish its graphene entanglements more easily, possibly due to a reduced interfacial attraction.

Another important point when considering effects of fillers, such as graphene, is the nature of the interfacial forces between the polymer and particle. In simulations it has been shown that attractive forces at the particle surface can result in a greater entanglement density surrounding the particle surface, thereby leading to increases in modulus. In choosing to compare the composites according to $A_f$ values, it is noted that the equations utilized, which assume perfect lamination between matrix and filler and a no-slip condition at the interface, do not account for variations in interfacial attraction and the phenomenon of entanglements. Alternatively, Lu et al. have developed a similar set of micro-mechanical equations that do account for the effects of entanglements caused by interfacial forces. In those results, increasing the volume or modulus of the entanglement "interphase" surrounding each nanoparticle can result in a linear increase in composite modulus similar to the linear trend seen with particle size. Thus, it is asserted that $A_f$ values calculated from the basic equations are also an indicator of strong interfacial forces as well as particle geometry and the quality of dispersion.

Given the presence of epoxide, hydroxyl, and carbonyl groups on the graphene (for example thermally reduced graphene) surface and ester linkages along the polyhydroxyalkanoate chain, the possibility does exist for the formation of polarity-based van der Waals attractions as well as hydrogen bonding. However, in PHA$_{mcl}$ polymers the presence of long aliphatic extension from the polyester backbone would likely reduce the intensity of such interactions due to steric-hindrance of oxygen atoms along the polymer backbone. According to this hypothesis, it would be expected that the PHO polymer with its shorter aliphatic appendages would be more available for bonding interactions with graphene particles than the PHD polymer. Thus, PHO would exhibit a greater increase in the normalized modulus than PHD. In a related study of TRG composites, it was demonstrated that functionalization of polyethylene with different polar moieties capable of hydrogen bonding resulted in greater enhancements of the Young's modulus compared to TRG composites of unmodified polyethylene. Furthermore, samples prepared by solvent blending had greater modulus enhancement than those prepared by melt blending, presumably due to better dispersion of the filler.

Transmission Electron Microscopy

Figure 8:
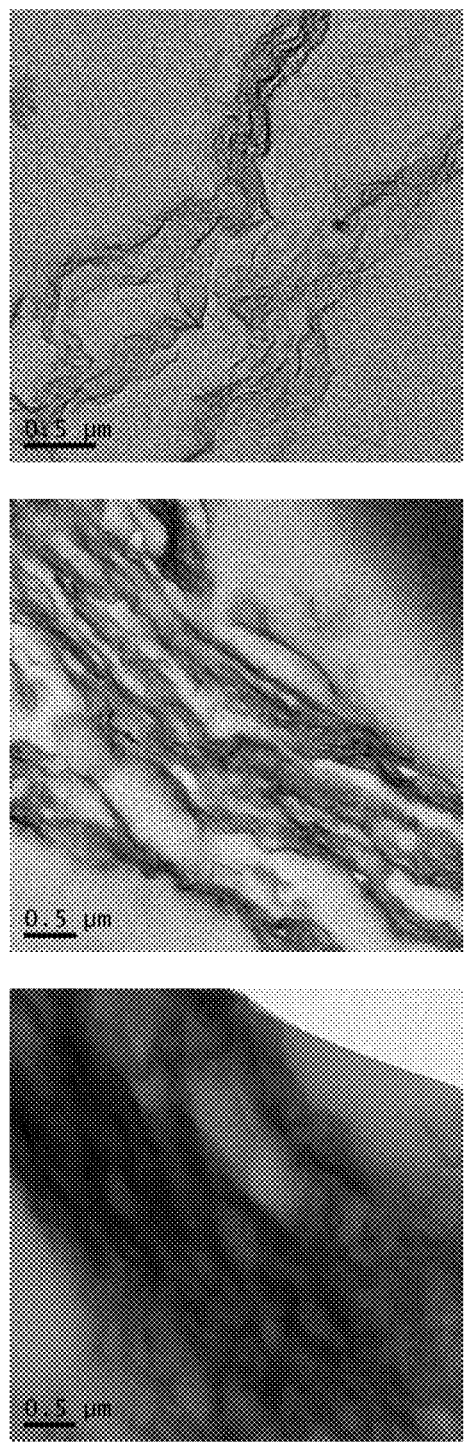
FIG. 8 shows TEM micrographs of nanocomposite samples. Polymer matrix (graphene loading, v/v): a. PHO (0.5%), b. PHO (1.0%), c. PHO (2.5%), d. PHOe (0.5%), e. PHD (0.5%).

TEM images were used to visually assess graphene dispersion within the matrix. FIG. 8 shows TEM images of the composite samples at a loading of 0.5%. The best dispersion of graphene is seen in the PHO sample (FIG. 8a) as indicated by the existence of transparent, likely single layer, graphene sheets. The poorest dispersion is seen in the PHOe sample (FIG. 8b) where the appearance of darkly contrasted and parallel edges is indicative of multilayer graphene aggregates. Similar dark edges are also seen in the PHD sample (FIG. 8c), but the more diffuse coloration suggests better separation and more randomly oriented graphene layers than in the PHOe sample. As presented in the previous discussion on electrical conductivity, percolation of a continuous graphene phase was estimated to occur at between 0.4-0.5% for all three matrices.

Scanning Electron Microscopy

Figure 9:
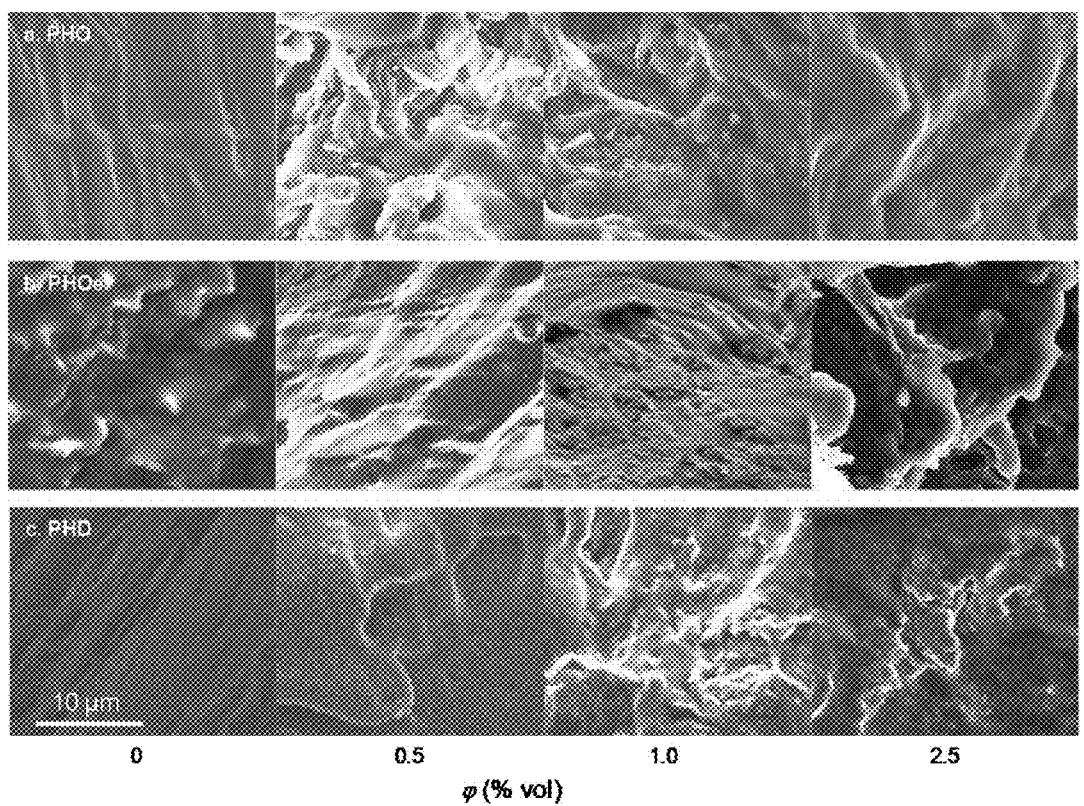
FIG. 9 shows SEM micrographs of nanocomposite samples (FIG. 9a; PHO.

Additionally, SEM images of fracture topology can be used to infer information about the entanglement structure of nanocomposites. Images of the fractured surfaces are presented in FIG. 9. When comparing among pure polymer samples only, i.e. 0% graphene loading, both the PHO (top panel) and PHD (bottom panel) samples show smooth surfaces while the PHOe (middle panel) sample is more textured. This surface roughness suggests inhomogeneity within the PHOe matrix, likely due the presence of cross-linking within the matrix.

With respect to graphene content, samples with increased filler loading tend to show greater surface roughness. The deeper cavities on the fracture surface, e.g. FIG. 9a PHO-0.5%, may be caused by pull-out of more rigid, graphene-polymer entanglements from the softer, bulk matrix. This result could indicate that even at a minimal filler loading of 0.5%, PHO molecules are capable of forming large entanglement masses with the graphene particles. It is noted that the characteristic size of features on the fracture surface are several μm in scale, yet the graphene particles used for reinforcement are on the order of tenths of μm in scale. Thus, the polymer entanglements that are induced by the presence of the graphene inclusions persist well beyond the characteristic size of the nanoparticles. The greatest variety of surface topology is seen for the PHO composites, which shows a strong correlation with the significant changes observed in the elongation at break values (see FIG. 5a) Interestingly, the PHO-0.5% composite exhibited a greater surface roughness than the PHO-2.5% composite. Thus, it may be that as the number of graphene particles increases, the large entanglement masses that surround individual particles merge and create a more uniform entanglement density. For PHD composites shown in FIG. 9c, only a minimal increase in surface roughness is seen with graphene loading. This is consistent with the observation that the PHD composites all showed similar strain and modulus values just prior to fracture (see FIG. 5c). This could be interpreted to mean that at the point of fracture the presence of graphene nanoparticles had minimal influence on the entanglement structure of the polymer. It may be that a strain induced alignment of the particles and/or disentanglement of polymer chains from the graphene particles resulted in greater homogeneity in the polymer cross section. Likewise, PHOe samples presented in FIG. 9b show little change in their fracture topology until the 2.5% graphene loading when the pull-out morphology appears. This again reflects the stress-strain trends seen in FIG. 5b. Thus, it can be inferred that only at the 2.5% graphene loading do significant polymer-graphene entanglements form within the PHOe matrix. It is possible that the preexisting cross-links in the PHOe matrix prevented the formation of polymer entanglements with graphene particles until enough particles were present to significantly disrupt the cross-linked network. Ultimately, these images demonstrate that free PHO molecules engage in polymer entanglements more readily than PHD molecules or cross-linked PHOe molecules.

The purpose of this investigation was to explore the different physical and mechanical properties of nanocomposite materials created by combining PHA$_{mcl}$ polymers and thermally reduced graphene filler. For changes in the thermal decomposition temperature, melting point, and glass transition point the effects of graphene loading are relatively small; however, polymer crystallinity shows a significant decreases with the addition of graphene filler by 15-55%. Despite the reduced crystallinity, the modulus of the three different polymers showed very significant increases from 200-600% at 2.5% graphene loading. Furthermore, the addition of graphene also provided a significant enhancement in the electrical conductivity of the polymers with percolation of a continuous network structure occurring between 0.5-1.0% (v/v) graphene loading. At 2.5% graphene loading the bulk resistivity for all polymers had decreased by >7 orders of magnitude. Moreover, the results presented here show that the effective use of graphene filler to enhance polyhydroxyalkanoate polymers is applicable over a range of PHA types that vary in the length of their aliphatic appendages and presence of chemical cross-linking.

Thus, embodiments of compositions including poly(hydroxyalkanoates) and graphene are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A composite comprising:
   poly(hydroxyalkanoate) (PHA); and
   graphene, wherein said graphene comprises two-dimensional sheets and is atomically thick two-dimensional sheet composed of sp$^2$ carbon atoms arranged in a honeycomb structure.

2. The composite according to claim 1, wherein the PHA is of formula (I)

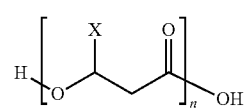

where X can independently comprise carbon containing chains having from one to eleven carbons, and n can be an integer greater than about 10.

3. The composite according to claim 2, wherein X can independently comprise carbon containing chains having from three to eleven carbons, and n can be an integer greater than about 10.

4. The composite according to claim 2, wherein the PHA comprises short chain length poly(hydroxyalkanoates) ($PHA_{SCL}$).

5. The composite according to claim 2, wherein the PHA comprises medium chain length poly(hydroxyalkanoates) ($PHA_{MCL}$).

6. The composite according to claim 5, wherein the $PHA_{MCL}$ have a total chain length from six to fourteen.

7. The composite according to claim 2, wherein X can independently comprise carbon containing chains of seven, five, three and one carbons.

8. The composite according to claim 2, wherein X can independently comprise elements other than carbon and hydrogen.

9. The composite according to claim 1, wherein the PHA is covalently crosslinked.

10. The composite according to claim 1 further comprising a second poly(hydroxyalkanoate).

11. The composite according to claim 1, wherein there is not greater than about 10% by volume of graphene in the composite based on the total volume of the composite.

12. The composite according to claim 1, wherein there is not greater than about 3% by volume of graphene in the composite based on the total volume of the composite.

13. The composite according to claim 1, wherein the graphene is chemically modified.

14. The composite according to claim 1 further comprising filler materials.

15. A method of forming a composite comprising the steps:
obtaining graphene via thermal reduction of graphene oxide;
mixing poly(hydroxyalkanoate) (PHA) and the graphene to form a composite mixture;
forming an article from the composite mixture; and
initiating crosslinking.

16. The method according to claim 15, wherein the composite mixture further comprises one or more solvents.

17. The method according to claim 16, wherein the PHA is separately dissolved in a first solvent and the graphene is separately dispersed in a second solvent before they are combined to form a composite mixture, wherein the first and second solvent can be the same or different.

18. The method according to claim 17, wherein the step of forming an article comprises evaporating at least a portion of the first and second solvent to form the article.

19. The method according to claim 18, wherein the step of forming an article further comprises heating, compressing, or heating and compressing the article after at least a portion of the first and second solvent have been removed.

20. The method according to claim 15, wherein initiating crosslinking occurs before the PHA and the graphene are mixed.

21. The method according to claim 15, wherein the graphene comprises oxygen and has a carbon to oxygen ratio (C:O) from about 2:1 to about 1:0.

22. The method according to claim 21, wherein the graphene has a high surface area to volume ratio.

23. A composite comprising:
poly(hydroxyalkanoate) (PHA); and
graphene, wherein said graphene comprises two-dimensional sheets and was formed by a top-down process.

24. The composite according to claim 23, wherein the PHA is of formula (I)

where X can independently comprise carbon containing chains having from one to eleven carbons, and n can be an integer greater than about 10.

25. The composite according to claim 23, wherein the PHA comprises short chain length poly(hydroxyalkanoates) ($PHA_{SCL}$).

26. The composite according to claim 23, wherein the PHA comprises medium chain length poly(hydroxyalkanoates) ($PHA_{MCL}$) having a total chain length from six to fourteen.

27. The composite according to claim 23, wherein the PHA is covalently crosslinked.

28. The composite according to claim 23, wherein there is not greater than about 10% by volume of graphene in the composite based on the total volume of the composite.

29. The composite according to claim 23, wherein the graphene is chemically modified.

30. The composite according to claim 23 further comprising filler materials.

* * * * *